United States Patent
Oami et al.

(10) Patent No.: US 10,977,916 B2
(45) Date of Patent: *Apr. 13, 2021

(54) SURVEILLANCE SYSTEM, SURVEILLANCE NETWORK CONSTRUCTION METHOD, AND PROGRAM

(71) Applicant: NEC CORPORATION, Tokyo (JP)

(72) Inventors: Ryoma Oami, Tokyo (JP); Katsuhiko Takahashi, Tokyo (JP); Yuusuke Konishi, Tokyo (JP); Hiroo Ikeda, Tokyo (JP); Junko Nakagawa, Tokyo (JP); Kosuke Yoshimi, Tokyo (JP); Yukie Ebiyama, Tokyo (JP); Ryo Kawai, Tokyo (JP); Takuya Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/352,429

(22) Filed: Mar. 13, 2019

(65) Prior Publication Data

US 2019/0213855 A1  Jul. 11, 2019

Related U.S. Application Data

(63) Continuation of application No. 15/754,622, filed as application No. PCT/JP2016/073887 on Aug. 16, 2016.

(30) Foreign Application Priority Data

Sep. 2, 2015  (JP) .................................. 2015-173123

(51) Int. Cl.
*G08B 13/196* (2006.01)
*H04N 7/18* (2006.01)
(Continued)

(52) U.S. Cl.
CPC ........ *G08B 13/19656* (2013.01); *G01S 19/42* (2013.01); *G06Q 30/0207* (2013.01);
(Continued)

(58) Field of Classification Search
None
See application file for complete search history.

(56) References Cited

U.S. PATENT DOCUMENTS

| 5,335,180 A | 8/1994 | Takahashi et al. |
| 2003/0107648 A1* | 6/2003 | Stewart .............. G08B 13/1966 348/143 |

(Continued)

FOREIGN PATENT DOCUMENTS

| JP | 2002-183380 A | 6/2002 |
| JP | 2003-151055 A | 5/2003 |

(Continued)

OTHER PUBLICATIONS

International Search Report for PCT/JP2016/073887 dated Nov. 8, 2016 [PCT/ISA/210].

(Continued)

*Primary Examiner* — Kate H Luo
(74) *Attorney, Agent, or Firm* — Sughrue Mion, PLLC

(57) ABSTRACT

A surveillance system (1) includes an area information acquisition unit (101), a request information provision unit (102), and a participation consent reception unit (103). The area information acquisition unit (101) acquires information of a surveillance-desired area. The request information provision unit (102) provides participation request information for surveillance that is conducted by using an image capturing unit of a portable terminal in the surveillance-desired area. The participation consent reception unit (103) receives participation consent as a response to the participation request information, from the portable terminal.

17 Claims, 22 Drawing Sheets

(51) Int. Cl.
   *G01S 19/42*    (2010.01)
   *G06Q 30/02*    (2012.01)
   *H04M 1/725*    (2021.01)
   *H04M 1/02*     (2006.01)
   *H04W 88/08*    (2009.01)
   *H04W 84/12*    (2009.01)

(52) U.S. Cl.
   CPC ... *G08B 13/1968* (2013.01); *G08B 13/19621* (2013.01); *G08B 13/19636* (2013.01); *G08B 13/19641* (2013.01); *G08B 13/19645* (2013.01); *G08B 13/19652* (2013.01); *G08B 13/19682* (2013.01); *H04M 1/72522* (2013.01); *H04N 7/183* (2013.01); *H04M 1/0202* (2013.01); *H04M 1/72572* (2013.01); *H04M 2250/52* (2013.01); *H04W 84/12* (2013.01); *H04W 88/08* (2013.01)

(56) References Cited

U.S. PATENT DOCUMENTS

| | | | |
|---|---|---|---|
| 2004/0039504 A1 | 2/2004 | Coffee et al. | |
| 2006/0048286 A1* | 3/2006 | Donato | G02B 27/0176 2/422 |
| 2009/0324010 A1 | 12/2009 | Hou | |
| 2010/0085431 A1* | 4/2010 | Trapani | G08B 13/19647 348/148 |
| 2011/0231316 A1 | 9/2011 | Carroll, III | |
| 2014/0132772 A1* | 5/2014 | Billau | H04N 7/18 348/159 |
| 2014/0172477 A1 | 6/2014 | Goulart | |
| 2014/0333775 A1* | 11/2014 | Naikal | G06K 9/00711 348/159 |
| 2014/0358419 A1 | 12/2014 | Inagaki | |
| 2014/0375800 A1* | 12/2014 | Lim | H04M 1/72538 348/143 |
| 2015/0078618 A1* | 3/2015 | Kim | G08B 13/19608 382/103 |
| 2016/0044279 A1 | 2/2016 | Block et al. | |
| 2016/0212504 A1* | 7/2016 | Meng | H04N 21/21805 |
| 2016/0300463 A1* | 10/2016 | Mahar | H04N 7/183 |
| 2016/0329053 A1* | 11/2016 | Grahm | G06F 1/1694 |
| 2016/0365885 A1* | 12/2016 | Honjo | H04B 1/38 |
| 2016/0366327 A1 | 12/2016 | Kusens | |
| 2017/0140457 A1 | 5/2017 | Kaku et al. | |

FOREIGN PATENT DOCUMENTS

| | | |
|---|---|---|
| JP | 2003-264821 A | 9/2003 |
| JP | 2003284139 A | 10/2003 |
| JP | 2004-015336 A | 1/2004 |
| JP | 2005-136921 A | 5/2005 |
| JP | 2005-208858 A | 8/2005 |
| JP | 2005252757 A | 9/2005 |
| JP | 2007-110642 A | 4/2007 |
| JP | 2008-65796 A | 3/2008 |
| JP | 2008-123366 A | 5/2008 |
| JP | 200992423 A | 4/2009 |
| JP | 2010-271924 A | 12/2010 |
| JP | 2010-278962 A | 12/2010 |
| JP | 2012-104022 A | 5/2012 |
| JP | 2012-234449 A | 11/2012 |
| JP | 2013-179465 A | 9/2013 |
| JP | 2013-258532 A | 12/2013 |
| JP | 2014-107831 A | 6/2014 |
| JP | 2014-235602 A | 12/2014 |
| JP | 201546842 A | 3/2015 |
| WO | 2012096166 A1 | 7/2012 |

OTHER PUBLICATIONS

Kiwi-W Consortium, Car Navigation System—Kokaigata Data Kozo KIWI to sono Riyo Hoho-, 1st edition, Kyoritsu Shuppan Co., Ltd., Feb. 25, 2003, pp. 96 to 97.
Office Action dated Apr. 28, 2020 in Japanese Application No. 2017-537716, Machine Translation.
Office Action dated Jun. 27, 2019 in U.S. Appl. No. 15/754,378.
Office Action dated Nov. 19, 2019 in U.S. Appl. No. 15/754,378.
International Search Report for PCT/JP2016/073886 dated Nov. 8, 2016 [PCT/ISA/210], English Translation.
Office Action dated Mar. 24, 2020 in U.S. Appl. No. 16/352,186.
Office Action dated Aug. 27, 2020 in U.S. Appl. No. 16/352,258.
Office Action dated Jun. 12, 2020 in U.S. Appl. No. 15/754,622.
Office Action dated Aug. 11, 2020 in Japanese Application No. 2017-537717, Machine Translation.
Notice of Allowance dated Sep. 3, 2020 in U.S. Appl. No. 16/352,186.
Notice of Allowance dated Oct. 29, 2020 in U.S. Appl. No. 16/352,340.
Office Action dated Jun. 10, 2020 in U.S. Appl. No. 15/754,378.
Office Action dated Apr. 3, 2020 in U.S. Appl. No. 16/352,258.
Communication dated May 12, 2020, from the Japanese Patent Office in application No. 2017-537717.
Office Action dated Jul. 1, 2020, issued by the U.S. Patent and Trademark Office in U.S. Appl. No. 16/352,340.

* cited by examiner

FIG. 7

| DISPLAY EQUIPMENT IDENTIFICATION INFORMATION | POSITION INFORMATION |
|---|---|
| D001 | xxx,xxx |
| D002 | yyy,yyy |
| ⋮ | ⋮ |

FIG. 12

| TERMINAL IDENTIFICATION INFORMATION | POSITION INFORMATION |
|---|---|
| T001 | xxx,xxx |
| T002 | yyy,yyy |
| ⋮ | ⋮ |

SURVEILLANCE SYSTEM, SURVEILLANCE NETWORK CONSTRUCTION METHOD, AND PROGRAM

CROSS REFERENCE TO RELATED APPLICATION

This application is a Continuation of U.S. patent application Ser. No. 15/754,622, filed on Feb. 23, 2018, which is a National Stage of International Application No. PCT/JP2016/073887 filed on Aug. 16, 2016, which claims priority from Japanese Patent Application No. 2015-173123, filed Sep. 2, 2015, the contents of all of which are incorporated herein by reference in their entirety.

TECHNICAL FIELD

The present invention relates to a surveillance system that surveils a predetermined area.

BACKGROUND ART

In a place such as an event venue, in which many people gather, a surveillance system for detecting or preventing any type of abnormality is required.

As an example of a technology relating to the above-described surveillance system, for example, the following Patent Document 1 is provided. Patent Document 1 discloses a technology in which a security guard is caused to wear a simple body-worn camera or the like, and surveillance is performed by using an image which has been captured by the body-worn camera.

RELATED DOCUMENT

Patent Document

[Patent Document 1] Japanese Patent Application Publication No. 2013-258532

SUMMARY OF THE INVENTION

Technical Problem

However, for example, in a large-scale event, the number of security guards is insufficient in comparison to the number of people who gather, and thus some areas may be lightly surveilled. In a case where the number of security guards is increased as measures for such a situation, cost required for surveillance is increased.

An object of the present invention is to provide a technology of suppressing an increase of cost required for surveillance work and constructing a sufficient surveillance system.

Solution to Problem

According to the present invention, there is provided a surveillance system. The surveillance system includes an area information acquisition unit that acquires information of a surveillance-desired area, a request information provision unit that provides participation request information for surveillance that is conducted by using an image capturing unit of a portable terminal in the surveillance-desired area, and a participation consent reception unit that receives participation consent as a response to the participation request information, from the portable terminal.

According to the present invention, there is provided a surveillance network construction method executed by a computer. The method includes acquiring information of a surveillance-desired area, providing participation request information for surveillance that is conducted by using an image capturing unit of a portable terminal in the surveillance-desired area, and receiving participation consent as a response to the participation request information, from the portable terminal.

According to the present invention, there is provided a program causing a computer to function as: an area information acquisition unit that acquires information of a surveillance-desired area, a request information provision unit that provides participation request information for surveillance that is conducted by using an image capturing unit of a portable terminal in the surveillance-desired area, and a participation consent reception unit that receives participation consent as a response to the participation request information, from the portable terminal.

Advantageous Effects of Invention

According to the present invention, it is possible to suppress an increase of cost required for surveillance work and to construct a sufficient surveillance system.

BRIEF DESCRIPTION OF THE DRAWINGS

The above-described objects and other objects, features, and advantages are clarified more by the preferred example embodiment (which will be described below) and the following accompanying drawings.

FIG. 7 is a diagram illustrating an example of information held by a display equipment identification unit.

FIG. 12 is a diagram illustrating an example of a table for managing position information of a portable terminal that transmits participation consent.

DESCRIPTION OF EMBODIMENTS

Hereinafter, example embodiments of the present invention will be described with reference to the drawings. In all the drawings, the same components are denoted by the same reference signs and descriptions thereof will not be repeated.

First Example Embodiment

[System Configuration]

Figure 1:
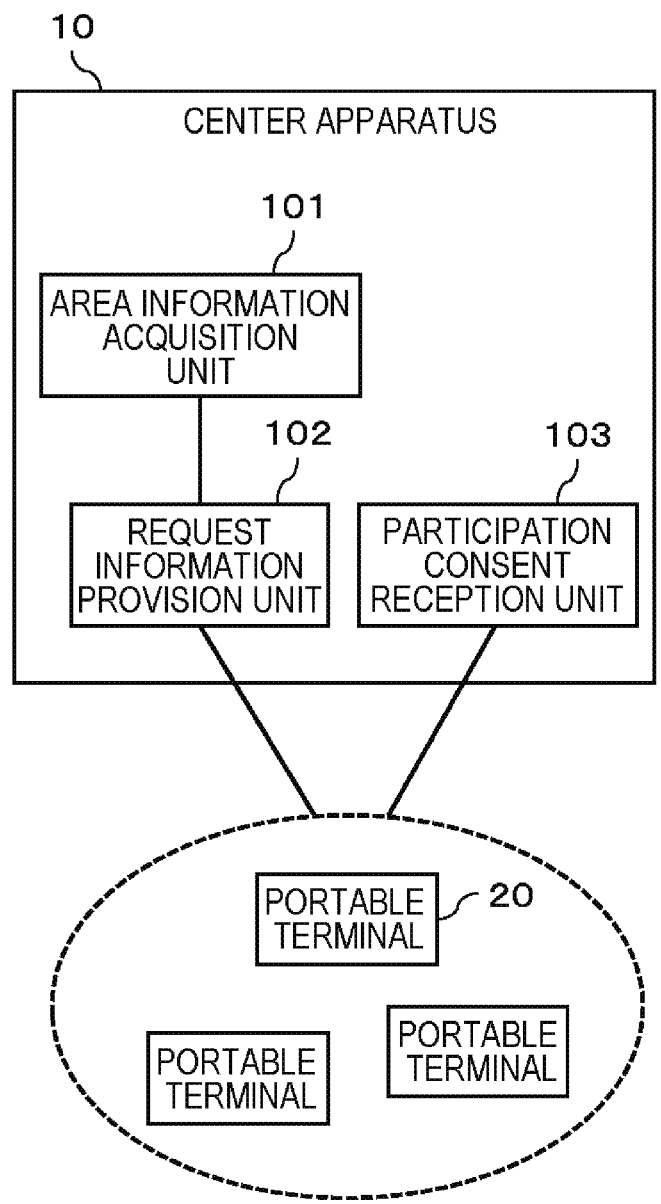
FIG. 1 is a diagram conceptually illustrating a system configuration of a surveillance system according to a first example embodiment.

FIG. 1 is a diagram conceptually illustrating a system configuration of a surveillance system 1 according to a first example embodiment. As illustrated in FIG. 1, the surveillance system 1 in this example embodiment includes a center apparatus 10 and one portable terminal or more 20.

The center apparatus 10 performs surveillance work by using pieces of information which are collected from a surveillance device (not illustrated) (for example, a fixed-point surveillance camera provided on a wall, a ceiling, or the like, or a mobile surveillance camera held by a security guard) connected through a network or the like. Although details will be described in other example embodiments, the center apparatus 10 performs surveillance work by using an image which has been captured by the portable terminal 20 in a place to be surveilled such as an event venue. For example, the center apparatus 10 may be a stationary personal computer (PC) which is included in a building (in a surveillance center) or in a moving object such as a vehicle. The center apparatus 10 may be a portable terminal such as a smart phone or a tablet terminal.

The portable terminal 20 is a terminal carried, for example, by a person who is not a security guard, such as a visitor of an event. The portable terminal 20 is not particularly limited so long as the terminal can capture an image (motion image or still image) of the surroundings and transmit the captured image through a network. Specific examples of the portable terminal 20 include a smart phone, a tablet terminal, and a mobile telephone.

[Processing Configuration]

As illustrated in FIG. 1, the center apparatus 10 in the example embodiment includes an area information acquisition unit 101, a request information provision unit 102, and a participation consent reception unit 103.

The area information acquisition unit 101 acquires information of a surveillance-desired area. The "surveillance-desired area" means an area of which an operator (also described as a surveillance operator below) of the center apparatus 10 desires enhancement of surveillance, and is at least a portion area of the entire area (surveillance target area) surveilled by the surveillance system 1 according to the present invention. The surveillance operator determines an area of which surveillance is to be enhanced, based on various kinds of information which are collected for surveillance work, and specifies the determined area through an input device of the center apparatus 10. The area information acquisition unit 101 acquires this input of the surveillance operator, as the information of the surveillance-desired area.

For example, the area information acquisition unit 101 receives an input of the surveillance-desired area from the surveillance operator through a map of a place to be surveilled displayed in a display unit of the center apparatus 10. On the map, as information for determination of the surveillance-desired area, for example, heat maps (map indicating distribution of the degree of congestion) and the like generated by using an analysis result of an image of a fixed-point surveillance camera or a mobile surveillance camera may be displayed in a state of being superimposed. The area information acquisition unit 101 acquires an area overlapping a figure which is drawn on the map by the surveillance operator, as the surveillance-desired area. The surveillance operator draws the figure, for example, by using an input device such as a mouse or a touch panel. In a case where the map of the place to be surveilled is previously divided into a plurality of areas, the area information acquisition unit 101 also may acquire an area which is selected among the plurality of areas by the surveillance operator with the input device, as the surveillance-desired area.

In addition, the area information acquisition unit 101 may automatically determine an area of which surveillance is to be enhanced, by using various kinds of information which are collected for the surveillance work, and may acquire the determined area as the surveillance-desired area. The area information acquisition unit 101 may determine the surveillance-desired area based on distribution of the degree of congestion, distribution of pieces of position information of terminals of people on guard, or the like, which are calculated by analyzing an image of a fixed-point surveillance camera or a mobile surveillance camera, for example. In a case where a place has characteristics of easy occurrence of an accident in comparison to other places, because of being inclined or narrow, the surveillance-desired area may be determined in consideration of dangerousness of each place in the surveillance target area. As in marathon, participants and the concerned parties of the event may move by the progress of an event, and thus the place to be surveilled may move. In such a case, the area information acquisition unit 101 may be configured to acquire position information of a person (for example, in a case of marathon, security guards or guides at the leading and the last) who can be considered as a marker among participants and the concerned parties of an event, and to determine the surveillance target area based on the acquired position information.

The request information provision unit 102 provides participation request information for surveillance that is conducted by using an image capturing unit of a portable terminal in the surveillance-desired area. The "participation request information" means information for requiring a general person who is not a security guard, to participate in surveillance work. Although details thereof will be described in other example embodiments, the request information provision unit 102 provides participation request information to a display unit of the portable terminal 20 present in the surveillance-desired area, equipment such as a digital signage, which is provided in a place corresponding to the surveillance-desired area, a Web page relating to the place to be surveilled or the surveillance-desired area, or the like.

A user of the portable terminal 20 checks the participation request information provided from the request information provision unit 102, and determines whether or not to participate in the surveillance work. In a case where the user of the portable terminal 20 participates in the surveillance work, the user of the portable terminal 20 performs a predetermined procedure so as to cause participation consent to be transmitted from the portable terminal 20. The "participation consent" means any type of information by which the user of the portable terminal 20 expresses participation in the surveillance work. For example, when an application required for surveillance work is installed on the portable terminal 20, the portable terminal 20 may be set to wait in a state in which participation request information can be received from the center apparatus 10. When an operation of expressing participation is performed in response to the received participation request information, a notification of participation consent may be transmitted from the portable terminal 20. For example, access to a predetermined Web site may be performed in accordance with the participation request information displayed in display equipment such as a digital signage, by using the portable terminal 20. Then, an application required for surveillance work may be downloaded or installed, and thus a notification of participation consent may be transmitted to the center apparatus 10. For example, when a message indicating that "How about participating in surveillance work?" is displayed as the participation request information, in the portable terminal 20 based on contact information of the portable terminal 20 which is previously registered on the center apparatus 10 side, and the user of the portable terminal 20 selects a button for expressing participation, a notification of participation consent may be transmitted to the center apparatus 10 from the portable terminal 20. In the present invention, the form of the participation consent is not limited so long as the center apparatus 10 side can recognize that the user of the portable terminal 20 expresses participation in the surveillance work.

The participation consent reception unit 103 receives participation consent from the portable terminal 20, in response to the participation request information provided from the request information provision unit 102. The participation consent reception unit 103 also receives and holds terminal identification information for identifying the portable terminal 20, from the portable terminal 20 which has transmitted the participation consent. Thus, the portable terminal 20 which has transmitted the participation consent is recognized as "a terminal of a temporary security guard", in the center apparatus 10. Note that, the participation consent reception unit 103 may receive the participation consent from portable terminals 20 of which the number is greater than necessary. In this case, the participation consent reception unit 103 may adjust the number of portable terminals 20 of which participation consent is formally received, in a manner of an order of transmission, a lottery, or the like.

[Hardware Configuration]

Figure 2:
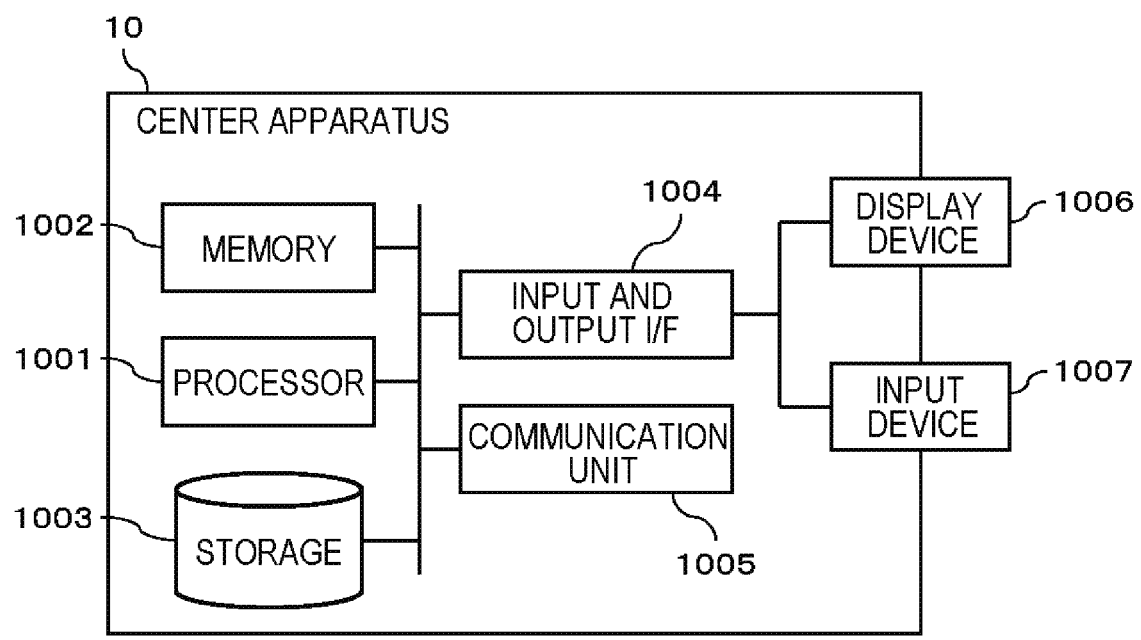
FIG. 2 is a diagram conceptually illustrating a hardware configuration of a center apparatus in the first example embodiment.

FIG. 2 is a diagram conceptually illustrating a hardware configuration of the center apparatus 10 in the first example embodiment.

The center apparatus 10 includes a processor 1001, a memory 1002, a storage 1003, an input and output interface (input and output I/F) 1004, a communication unit 1005, and the like. The processor 1001, the memory 1002, the storage 1003, the input and output interface 1004, and the communication unit 1005 are connected to each other by a data transmission path for transmitting and receiving data.

The processor 1001 is, for example, an arithmetic processing unit such as a central processing unit (CPU) or a graphic processing unit (GPU). The memory 1002 is, for example, a memory such as a random access memory (RAM) or a read only memory (ROM). The storage 1003 is, for example, a storage device such as a hard disk drive (HDD), a solid state drive (SSD), or a memory card. The storage 1003 may be a memory such as a RAM or a ROM.

The storage 1003 stores programs for realizing functions of the processing units (area information acquisition unit 101, request information provision unit 102, participation consent reception unit 103, and the like) included in the center apparatus 10. The processor 1001 realizes the functions of the processing units by executing the respective programs. Here, when the processor 1001 executes the programs, the processor 1001 may execute the programs after reading the programs into the memory 1002 or may execute the programs without reading the programs into the memory 1002.

The input and output interface 1004 is connected to a display device 1006, an input device 1007, and the like. The display device 1006 is a device such as a liquid crystal display (LCD) or a cathode ray tube (CRT) display, which displays a screen corresponding to drawing data processed by the processor 1001. The input device 1007 is a device that receives an operation input of an operator and is, for example, a keyboard, a mouse, a touch sensor, and the like. The display device 1006 and the input device 1007 may be integrated with each other, and thus may be configured as a touch panel.

The communication unit 1005 transmits and receives data to and from the portable terminal 20 or other external devices. For example, the communication unit 1005 communicates with the portable terminal 20 or other external devices through a wired network or a wireless network.

Note that, the hardware configuration of the center apparatus 10 is not limited to the configuration illustrated in FIG. 2.

Operation Example

Figure 3:
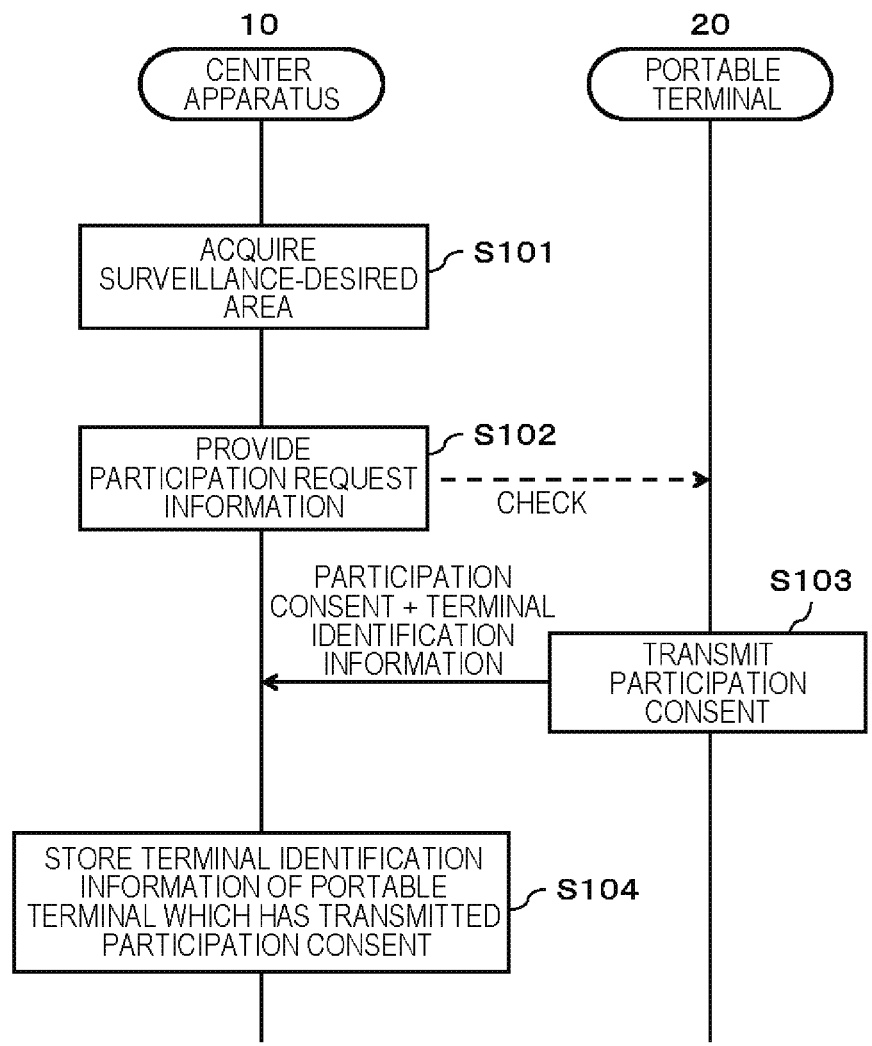
FIG. 3 is a sequence diagram illustrating a flow of processing of the surveillance system in the first example embodiment.

An operation example of the surveillance system 1 in this example embodiment will be described with reference to FIG. 3. FIG. 3 is a sequence diagram illustrating a flow of processing of the surveillance system 1 in the first example embodiment.

Firstly, the area information acquisition unit 101 of the center apparatus 10 acquires a surveillance-desired area (S101). The request information provision unit 102 provides participation request information for surveillance in the surveillance-desired area, which has been acquired in S101, to a user of the portable terminal 20 (S102). For example, the request information provision unit 102 provides the participation request information to the display unit of the portable terminal 20 present in the surveillance-desired area, display equipment installed in a place corresponding to the surveillance-desired area, a Web page of an event held in the surveillance-desired area, or the like. A user of the portable terminal 20 checks the participation request information provided from the request information provision unit 102, and determines whether or not to participate in the surveillance work. In a case where the user of the portable terminal 20 participates in the surveillance work, the user of the portable terminal 20 transmits participation consent in response to the provided participation request information, from this portable terminal 20 to the center apparatus 10 (S103). The participation consent reception unit 103 receives terminal identification information of the portable terminal 20 which has transmitted the participation consent, along with the participation consent, and stores the terminal identification information (S104). Thus, the portable terminal 20 which has transmitted the participation consent is recognized as "a terminal of a temporary security guard", in the center apparatus 10.

Hitherto, in this example embodiment, a participation request of surveillance work is provided to a general person who is not a security guard, and pieces of participation consent of surveillance work are received from the portable terminals 20 of general persons. Thus, the portable terminals 20 can be incorporated into the surveillance system 1, as terminals of "temporary security guards". That is, according to this example embodiment, it is possible to construct a surveillance network including general persons. Thus, for example, even in a situation in which more people gather in the place to be surveilled than expected, and thus the number of security guards is insufficient, it is possible to construct a sufficient surveillance system by supplementing persons corresponding to the insufficiency with general volunteers. When the surveillance is performed, there is no need to arrange more security guards than necessary beforehand. Thus, an effect of a reduced cost for security may also be expected.

Second Example Embodiment

In this example embodiment, the first example embodiment will be more specifically described.

[Processing Configuration 1]

Figure 4:
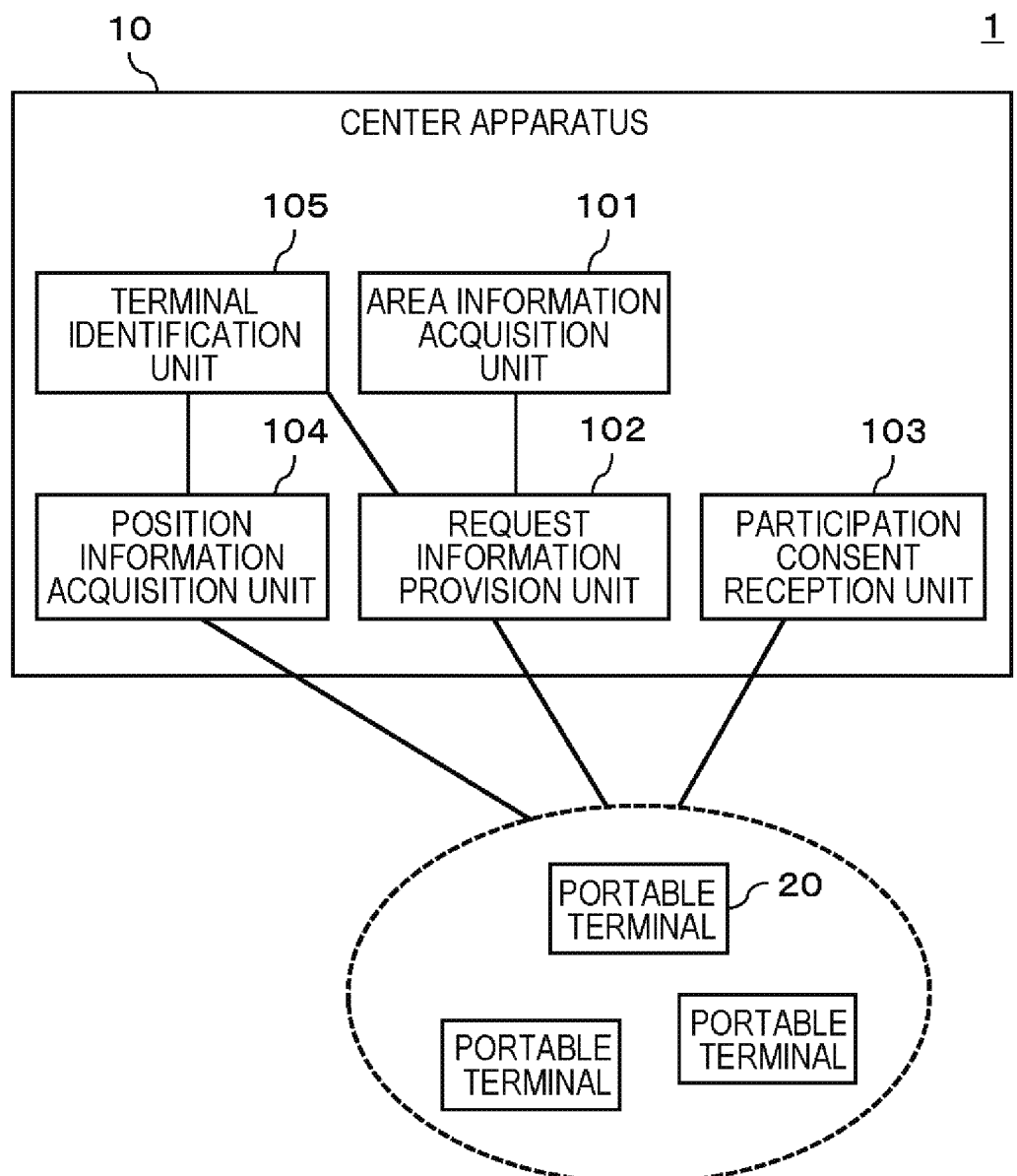
FIG. 4 is a diagram conceptually illustrating a processing configuration of a center apparatus in a first example according to a second example embodiment.

Firstly, a first example of a surveillance system 1 according to a second example embodiment will be described. FIG. 4 is a diagram conceptually illustrating a processing configuration of a center apparatus 10 in the first example of the second example embodiment. As illustrated in FIG. 4, in the first example, the center apparatus 10 further includes a position information acquisition unit 104 and a terminal identification unit 105.

The position information acquisition unit 104 acquires position information of each of portable terminals. The position information acquisition unit 104 acquires, for example, global positioning system (GPS) position information of the portable terminal 20. The present invention is not limited thereto. The position information acquisition unit 104 may acquire position information and the like of an access point of wireless fidelity (Wi-Fi) (registered trademark) present around the portable terminal 20, from the portable terminal 20. The position information acquisition unit 104 may identify position information of the portable terminal 20 based on the acquired position information of the access point. The position information acquisition unit 104 may acquire position information of each of the portable terminals 20 by, for example, using a technology such as Smartphone sensor (registered trademark) for detecting the presence of the portable terminal 20 in the neighborhood. Smartphone sensor (registered trademark) can detect a frame in a wireless LAN, which is emitted by each smart phone and recognize which smart phone is present in the neighborhood.

The terminal identification unit 105 identifies a portable terminal 20 present in the surveillance-desired area acquired in the area information acquisition unit 101, based on position information of each of the portable terminals 20, which is acquired by the position information acquisition unit 104. For example, the terminal identification unit 105 converts the position information of each of the portable terminals 20, which are acquired by the position information acquisition unit 104, into a coordinate system to which the position information of the surveillance-desired area belongs. The terminal identification unit 105 identifies whether or not the portable terminal 20 is present in the surveillance-desired area.

The request information provision unit 102 in the first example transmits participation request information to the portable terminal 20 identified by the terminal identification unit 105, and cause the display unit of the portable terminal 20 to display the participation request information. The request information provision unit 102 displays, for example, a message indicating "how about participating as a surveillance person?", in the display unit of the portable terminal 20. When an operation of expressing participation is performed in the portable terminal 20, participation consent is transmitted from the portable terminal 20 to the participation consent reception unit 103.

[Hardware Configuration 1]

In the first example in this example embodiment, the center apparatus 10 has a hardware configuration similar to FIG. 2. Specifically, the storage 1003 further stores programs for realizing the functions of the position information acquisition unit 104 and the terminal identification unit 105. The processor 1001 executes the programs so as to realize the position information acquisition unit 104 and the terminal identification unit 105.

Operation Example 1

Figure 5:
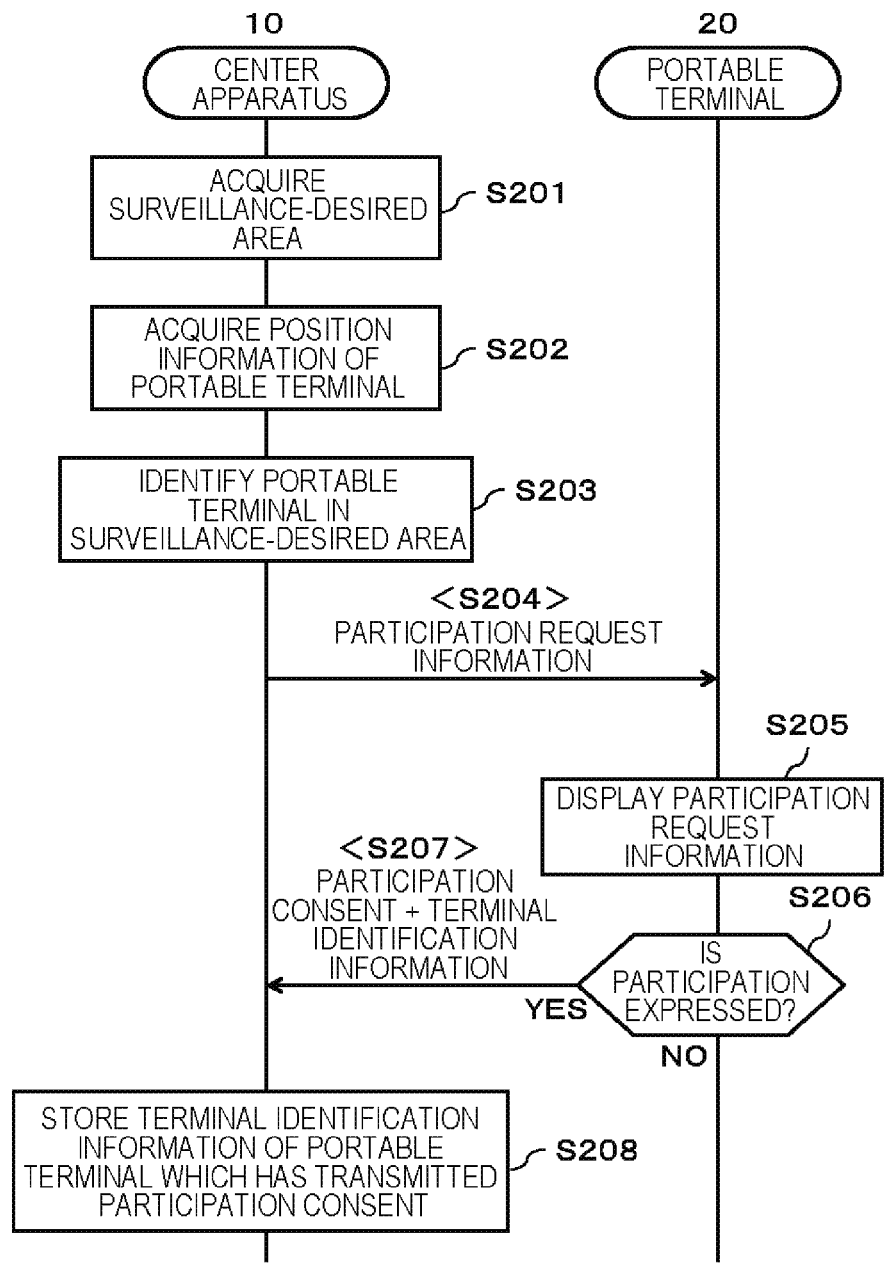
FIG. 5 is a sequence diagram illustrating a flow of processing of a surveillance system in the first example of the second example embodiment.

An operation of the surveillance system 1 including the center apparatus 10 in FIG. 4 will be described with reference to FIG. 5. FIG. 5 is a sequence diagram illustrating a flow of processing of the surveillance system 1 in the first example of the second example embodiment.

Similar to the first example embodiment, the area information acquisition unit 101 acquires a surveillance-desired area (S201). Subsequently or in parallel, the position information acquisition unit 104 acquires position information of each portable terminal 20 (S202). The terminal identification unit 105 identifies the portable terminal 20 present in the surveillance-desired area acquired in S201, based on the position information acquired in S202 (S203). The request information provision unit 102 transmits participation request information to the portable terminal 20 identified in S203 (S204). The portable terminal 20 displays the received participation request information in the display unit (S205). Here, in a case where the user of the portable terminal 20 does not express participation (NO in S206), a notification of participation consent is not transmitted to the center apparatus 10. On the other hand, in a case where the user of the portable terminal 20 performs an operation of expressing participation in surveillance work according to the participation request information (YES in S206), the portable terminal 20 transmits a notification of participation consent along with terminal identification information to the center apparatus 10 (S207). The participation consent reception unit 103 receives and stores the notification of the participation consent, which is transmitted from the portable terminal 20, along with the terminal identification information of the portable terminal 20 (S208). Thus, the portable terminal 20 which has transmitted the participation consent is recognized as "a terminal of a temporary security guard", in the center apparatus 10.

[Processing Configuration 2]

Figure 6:
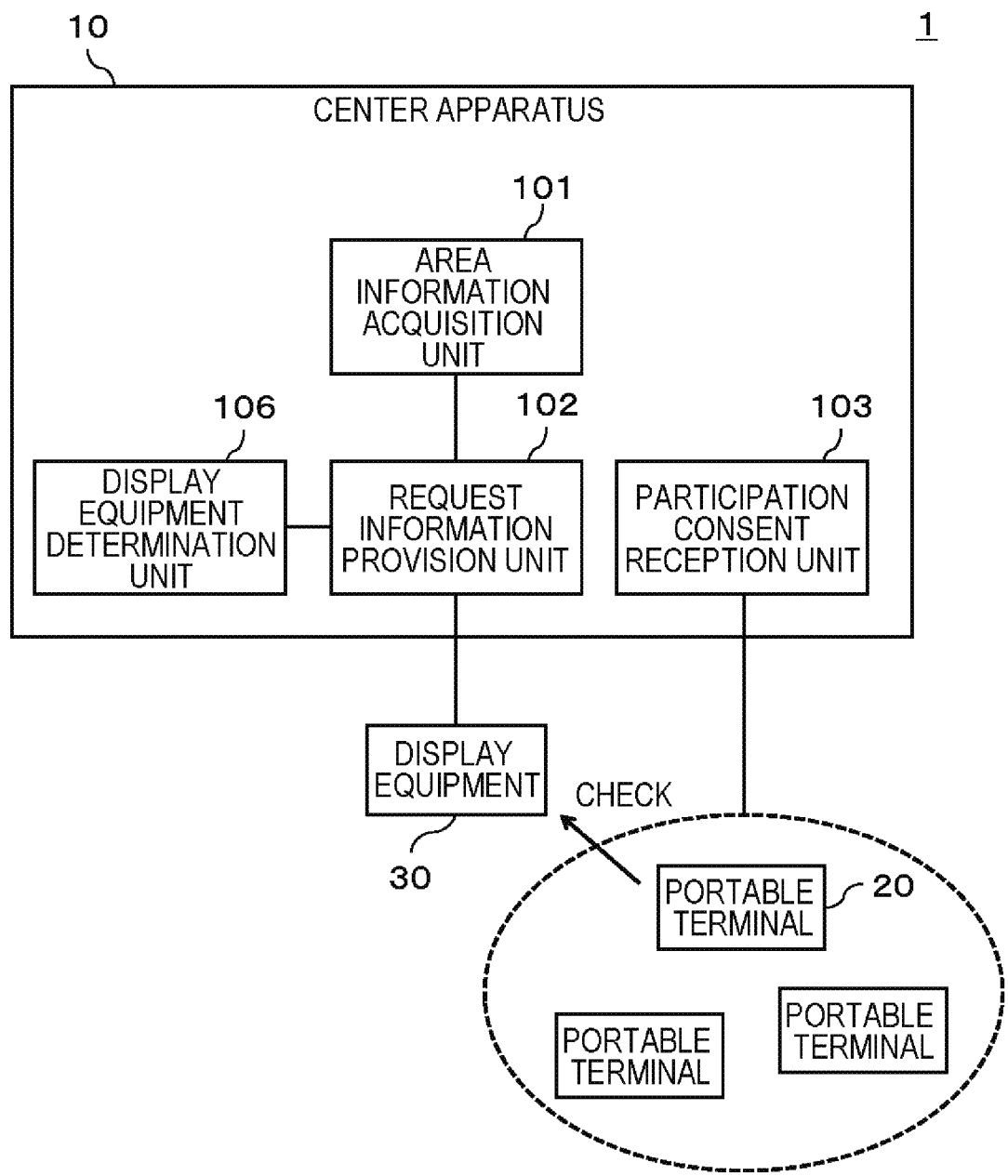
FIG. 6 is a diagram conceptually illustrating a processing configuration of a center apparatus in a second example of the second example embodiment.

Next, a second example of the surveillance system 1 in the second example embodiment will be described. FIG. 6 is a diagram conceptually illustrating a processing configuration of the center apparatus 10 in the second example of the second example embodiment. As illustrated in FIG. 6, the center apparatus 10 in the second example further includes a display equipment identification unit 106.

The display equipment identification unit 106 identifies a display equipment 30 installed in a place corresponding to the surveillance-desired area acquired in the area information acquisition unit 101. Specifically, for example, as illustrated in FIG. 7, the display equipment identification unit 106 holds information indicating an installation place of each piece of display equipment 30. The display equipment identification unit 106 identifies whether or not this display equipment is the display equipment 30 installed in a place corresponding to the surveillance-desired area, by using the held information. FIG. 7 is a diagram illustrating an example of the information held by the display equipment identification unit 106. In the example in FIG. 7, information for identifying each piece of display equipment 30 and position information of a place in which the display equipment 30 is installed are stored in association with each other. As the position information stored here, in order to easily perform comparison processing to position information of the surveillance-desired area, position information in a coordinate system of a map for specifying the surveillance-desired area is preferable.

The request information provision unit 102 in the second example transmits the participation request information to the display equipment 30 identified by the display equipment identification unit 106, and causes the display equipment 30 to display the participation request information. For example, identification information of the display equipment 30 and address information of the display equipment 30 are stored in a storage unit (not illustrated) in association with each other. The request information provision unit 102 acquires address information of the display equipment 30 by using identification information of the display equipment 30 which has been identified by the display equipment identification unit 106, and transmits the participation request information. The participation request information includes information (access information) for access to a unit that transmits participation consent from the portable terminal 20. The participation request information is displayed in the display equipment 30 along with a message of promoting participation of the user of the portable terminal 20. As the access information, for example, a code symbol such as a unidimensional or two-dimensional code obtained by encoding a uniform resource locator (URL) of a Web page or the URL itself is provided. The Web page is provided in order to allow downloading of an application required for surveillance work. The participation request information may include sound information which is output from a speaker of the display equipment 30. The user of the portable terminal 20 reads a code symbol by using the image capturing unit of the portable terminal 20 or accesses a Web page, for example, by inputting a URL in a browser. The user thereof causes the required application to be downloaded to the portable terminal 20 and be installed on the portable terminal 20. The participation consent reception unit 103 receives a notification of participation consent transmitted from the portable terminal 20 in response to the installation of the application, for example.

[Hardware Configuration 2]

In the second example in this example embodiment, the center apparatus 10 has a hardware configuration similar to FIG. 2. The storage 1003 further stores a program for realizing the function of the display equipment identification unit 106. The processor 1001 executes the program so as to realize the display equipment identification unit 106. The storage 1003 stores a table required for processing of the display equipment identification unit 106, as illustrated in FIG. 7.

Operation Example 2

Figure 8:
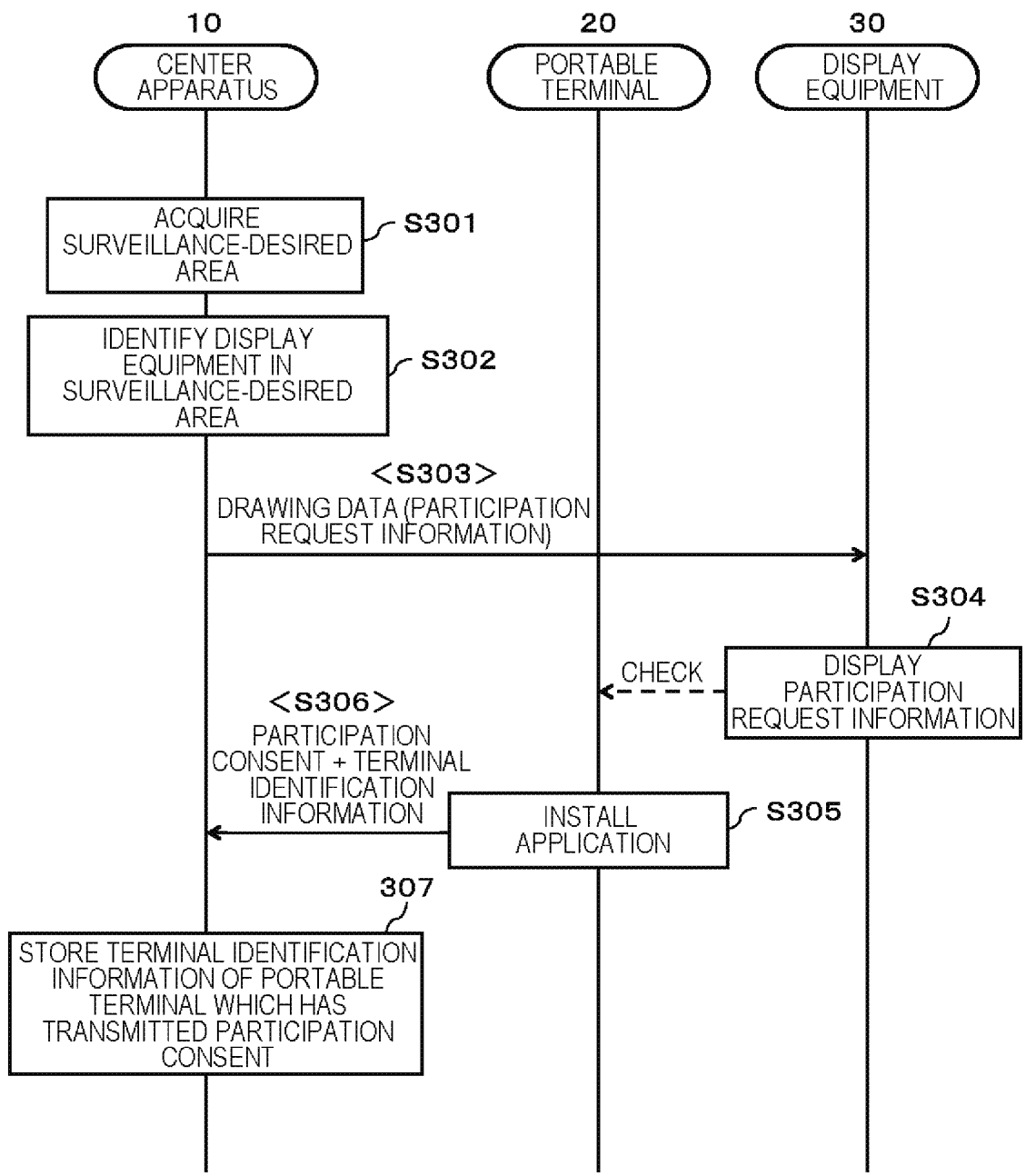
FIG. 8 is a sequence diagram illustrating a flow of processing of a surveillance system in the second example of the second example embodiment.

An operation of the surveillance system 1 including the center apparatus 10 in FIG. 6 will be described with reference to FIG. 8. FIG. 8 is a sequence diagram illustrating a flow of processing of the surveillance system 1 in the second example of the second example embodiment. Note that, a case in which participation request information which includes a two-dimensional code obtained by encoding a URL of a Web page which allows downloading of the required application is displayed will be described below.

Similar to the first example embodiment, the area information acquisition unit 101 acquires a surveillance-desired area (S301). Then, the display equipment identification unit 106 identifies display equipment 30 corresponding to the surveillance-desired area acquired in S201 (S302). For example, the display equipment identification unit 106 identifies display equipment 30 installed in the surveillance-desired area by using the information as illustrated in FIG. 7. The request information provision unit 102 generates drawing data of a screen which includes a message of requesting participation and a two-dimensional code obtained by encoding a URL which allows downloading of the required application. The request information provision unit 102 transmits the generated drawing data to the identified display equipment 30 (S303). The display equipment 30 displays the screen which includes the message of requesting participation and the two-dimensional code, based on the received drawing data (S303). A person who is near to the display equipment 30 checks the message displayed in the display equipment 30, and determines whether or not to participate in surveillance work. In a case where the user of the portable terminal 20 participates in the surveillance work, the user of the portable terminal 20 reads the two-dimensional code displayed in the display equipment 30, by using the own portable terminal 20 (S304). When an application is downloaded and installed from a Web page which is accessible by using the two-dimensional code on the portable terminal 20 (S305), a notification of participation consent along with terminal identification information is transmitted from the portable terminal 20 to the center apparatus 10 (S306). The participation consent reception unit 103 receives and stores the notification of the participation consent, which is transmitted from the portable terminal 20 along with the terminal identification information of the portable terminal 20 (S307). Thus, the portable terminal 20 which has transmitted the participation consent is recognized as "a terminal of a temporary security guard", in the center apparatus 10.

[Processing Configuration 3]

Figure 9:
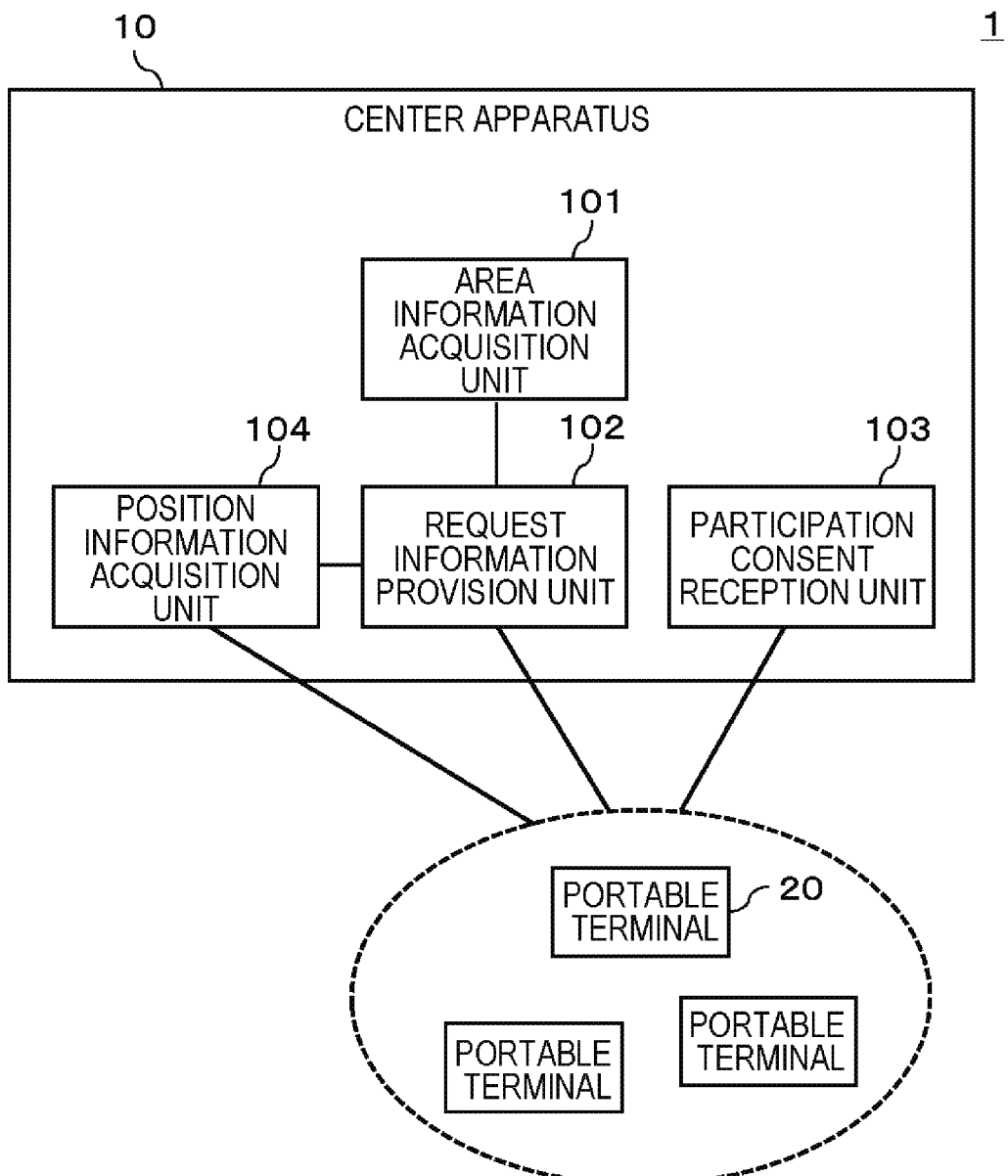
FIG. 9 is a diagram conceptually illustrating a processing configuration of a center apparatus in a third example of the second example embodiment.

Next, a third example of the surveillance system 1 in the second example embodiment will be described. FIG. 9 is a diagram conceptually illustrating a processing configuration of the center apparatus 10 in the third example of the second example embodiment. As illustrated in FIG. 9, the center apparatus 10 in the third example further includes a position information acquisition unit 104.

Similar to the above-described first example, the position information acquisition unit 104 acquires position information of each portable terminal.

The request information provision unit 102 in the third example provides a Web page relating to a place to be surveilled or a surveillance-desired area (for example, a community site of an event held in the place to be surveilled or a Web page for guiding a booth corresponding to the surveillance-desired area). Specifically, the request information provision unit 102 receives a Web page display request from a portable terminal 20 and transmits drawing data of a Web page to the portable terminal 20 which has transmitted the request. Here, in a case where position information of the portable terminal 20 which has transmitted the Web page display request indicates a place corresponding to the surveillance-desired area acquired by the area information acquisition unit 101, the request information provision unit 102 causes participation request information to be included in the drawing data transmitted to the portable terminal 20. Here, "the place corresponding to the surveillance-desired area" means, for example, a place within the surveillance-desired area or a place outside the surveillance-desired area but within a range of a predetermined distance from the surveillance-desired area. Information of the place corresponding to the surveillance-desired area is preset in the request information provision unit 102.

[Hardware Configuration 3]

In the third example in this example embodiment, the center apparatus 10 has a hardware configuration similar to FIG. 2. The storage 1003 further stores a program for realizing the function of the request information provision unit 102 in the third example. The processor 1001 executes the program so as to realize the request information provision unit 102 in the third example.

Operation Example 3

Figure 10:
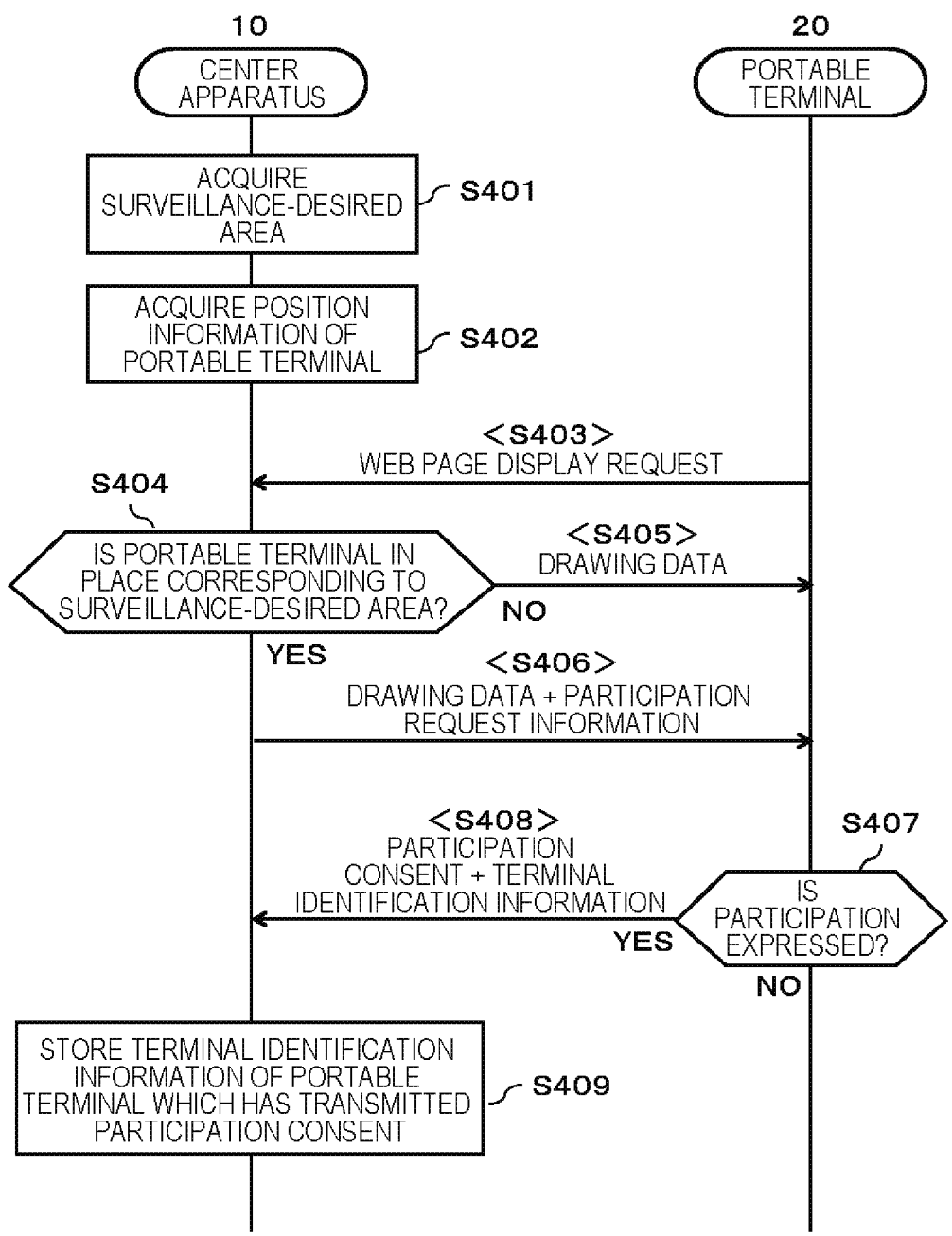
FIG. 10 is a sequence diagram illustrating a flow of processing of a surveillance system in the third example of the second example embodiment.

An operation of the surveillance system 1 including the center apparatus 10 in FIG. 9 will be described with reference to FIG. 10. FIG. 10 is a sequence diagram illustrating a flow of processing of the surveillance system 1 in the third example of the second example embodiment.

Similar to the first example embodiment, the area information acquisition unit 101 acquires a surveillance-desired area (S401). Subsequently or in parallel, the position information acquisition unit 104 acquires position information of each portable terminal 20 (S402). When a display request of a Web page is transmitted from the portable terminal 20 to the center apparatus 10 (S403), the request information provision unit 102 determines whether or not the portable terminal 20 is present in a place corresponding to the surveillance-desired area, based on position information of the portable terminal 20 which has transmitted the display request of a Web page (S404). In a case where the portable terminal 20 which has transmitted the display request of a Web page is not positioned in the place corresponding to the surveillance-desired area (NO in S404), the participation consent reception unit 103 transmits drawing data of a Web page which does not include participation request information, to the portable terminal 20 as a response (S405). In this case, the Web page which does not include participation information is displayed in the display unit of the portable terminal 20. On the other hand, in a case where the portable terminal 20 which has transmitted the display request of a Web page is present in the place corresponding to the surveillance-desired area (YES in S404), the participation consent reception unit 103 transmits drawing data of a Web page which includes the participation request information, to the portable terminal 20 as a response (S406). In this case, the Web page which includes the participation request information is displayed in the display unit of the portable terminal 20. Here, in a case where the user of the portable terminal 20 does not express participation in surveillance work (NO in S407), the notification of participation consent is not transmitted to the center apparatus 10. On the other hand, in a case where the user of the portable terminal 20 performs an operation of expressing participation in surveillance work according to the participation request information (YES in S407), the portable terminal 20 transmits a notification of participation consent along with terminal identification information to the center apparatus 10 (S408). The participation consent reception unit 103 receives and stores the notification of the participation consent, which is transmitted from the portable terminal 20 along with the terminal identification information of the portable terminal 20 (S409). Thus, the portable terminal 20 which has transmitted the participation consent is recognized as "a terminal of a temporary security guard", in the center apparatus 10.

As described above, according to this example embodiment, it is possible to obtain the effect described in the first example embodiment.

Third Example Embodiment

In this example embodiment, a surveillance system 1 which further includes a unit that allows a surveillance operator to easily recognize the position of a portable terminal 20 which has transmitted participation consent will be described.

[Processing Configuration]

Figure 11:
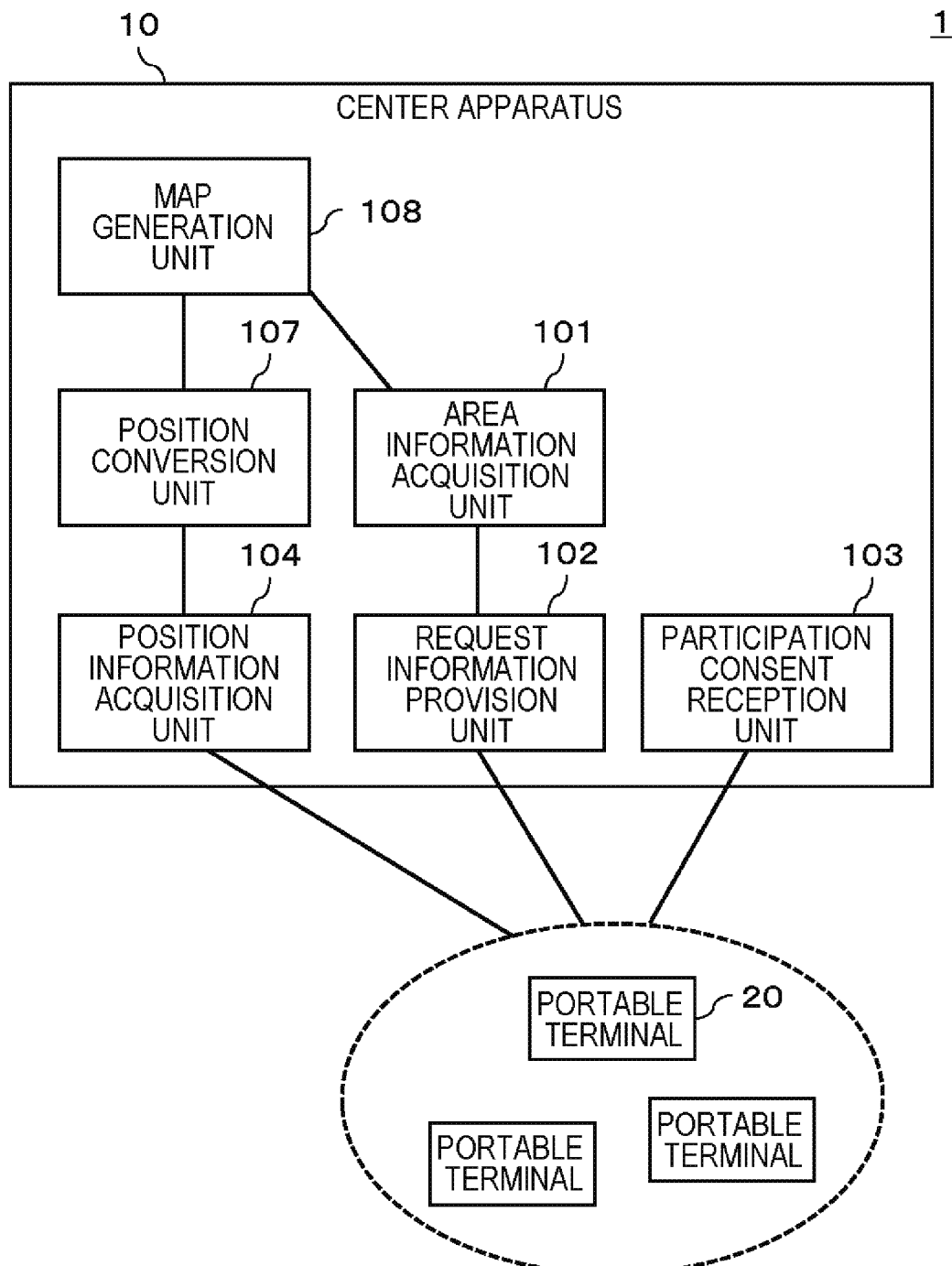
FIG. 11 is a diagram conceptually illustrating a processing configuration of a surveillance system according to a third example embodiment.

FIG. 11 is a diagram conceptually illustrating a processing configuration of the surveillance system 1 in a third example embodiment. As illustrated in FIG. 11, a center apparatus 10 in this example embodiment further includes a position information acquisition unit 104, a position conversion unit 107, and a map generation unit 108. Note that, FIG. 11 is illustrated based on the surveillance system 1 in the first example embodiment. However, the present invention is not limited thereto. The center apparatus 10 in this example embodiment may further include the components described in the second example embodiment.

The position information acquisition unit 104 acquires position information of each portable terminal 20. The position information acquisition unit 104 in this example embodiment acquires position information of a portable terminal 20 which has transmitted participation consent, and stores the acquired position information, for example, in a table as illustrated in FIG. 12. FIG. 12 is a diagram illustrating an example of the table for managing the position information of a portable terminal 20 which has transmitted participation consent. In the example in FIG. 12, terminal identification information (for example, MAC address) for identifying each portable terminal 20 and position information acquired by the position information acquisition unit 104 are stored in association with each other. The portable terminal 20 which has transmitted participation consent transmits the own position information along with the own terminal identification information, at a predetermined interval or the like. The position information acquisition unit 104 in this example embodiment acquires the position information and the terminal identification information. The position information acquisition unit 104 updates the table in FIG. 12 by using the position information and the terminal identification information which have been acquired. A method of managing position information of a portable terminal 20 is not limited to the example described here.

The position conversion unit 107 converts position information of the portable terminal 20 which has transmitted participation consent into position information on map data of an area which includes the surveillance-desired area. For example, the position conversion unit 107 holds a function of converting a coordinate system to which GPS position information or position information of an access point of Wi-Fi belongs, into a coordinate system of map data. The position conversion unit 107 converts position information of each portable terminal 20, which has been acquired by the position information acquisition unit 104, into position information of the map data by using the function.

Figure 13:
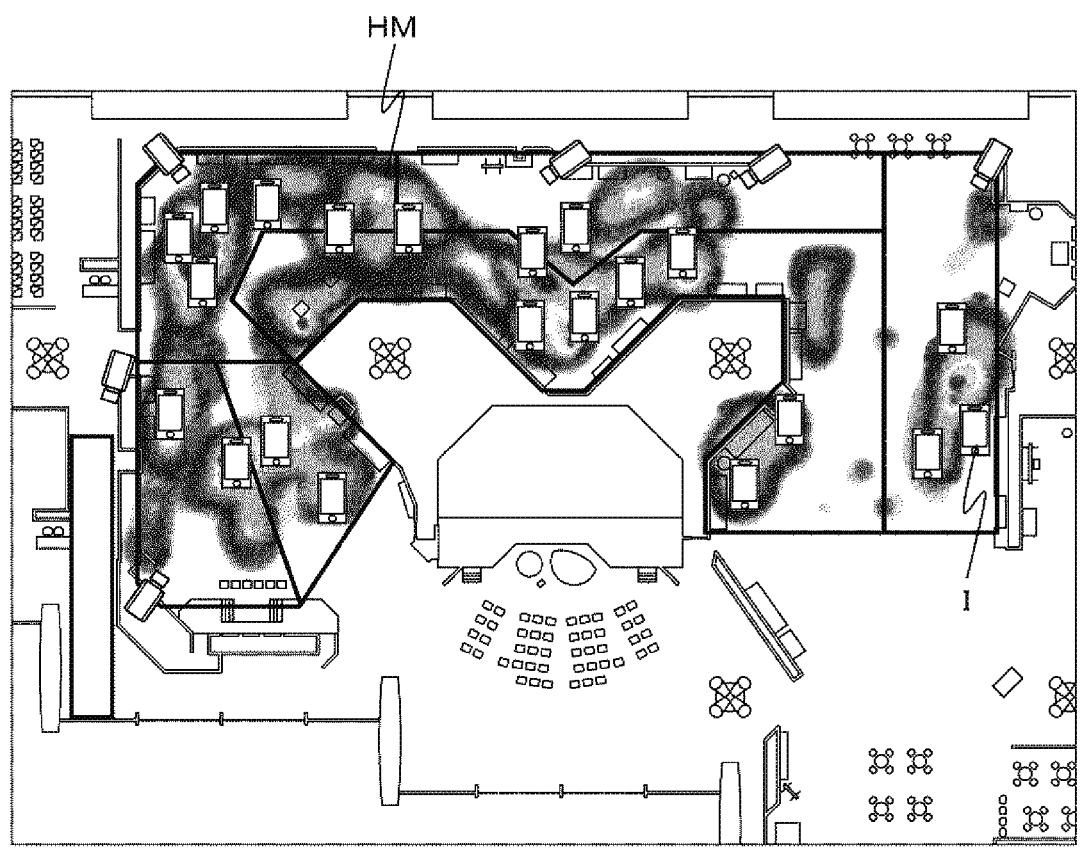
FIG. 13 is a diagram illustrating an example of map data generated by a map generation unit.

The map generation unit 108 generates map data indicating the position of the portable terminal 20 which has transmitted the participation consent, by using the position information which has been converted by the position conversion unit 107. For example, the map generation unit 108 generates map data as illustrated in FIG. 13. FIG. 13 is a diagram illustrating an example of the map data generated by the map generation unit 108. In the example in FIG. 13, the map generation unit 108 generates map data on which an icon I indicating the portable terminal 20 is superimposed, based on the position information which has been converted by the position conversion unit 107. As illustrated in the example in FIG. 13, the map generation unit 108 may generate map data on which heat map HM indicating the degree of congestion of an area is superimposed. For example, the degree of congestion of an area can be calculated by analyzing an image which has been captured by a fixed-point surveillance camera, an image which has been captured by a mobile surveillance camera of a security guard or the portable terminal 20 which has transmitted the participation consent. The surveillance operator can check distribution of the degree of congestion, distribution of portable terminals 20 which have transmitted the participation consent, and the like, based on the map as in FIG. 13. The surveillance operator can identify an area lightly guarded in comparison to the degree of congestion, the number of portable terminals 20 required in this area, and the like. The surveillance-desired area can also be specified on the map generated by the map generation unit 108. The map generation unit 108 may calculate and display distribution of the degree of a person staying in addition to the distribution of the degree of congestion. The degree of a person staying can be calculated, for example, by analyzing images captured by a fixed-point surveillance camera or a mobile surveillance camera including the portable terminal 20 in time series. Alternatively, the map generation unit 108 may calculate the degree of dissatisfaction indicating the degree of a person feeling dissatisfaction, and may display distribution thereof. For example, the degree of dissatisfaction of a person can be calculated by using a predetermined function of quantifying the progress of an event which is held (for example, the progress of a sports competition), weather information (temperature, humidity, and the like), degree of congestion of people, the degree of a person staying, and the like as the degree of dissatisfaction. Further, in a case where dangerousness varies depending on a place, the map generation unit 108 may display a difference of dangerousness on a map together. For example, the map generation unit 108 determines a presumably dangerous place based on attribute information which has been previously provided for each place, and displays the place with highlighting. Examples of a presumably dangerous place include an out-of-the-way place, a place having a narrow width, and a steeply-sloped or stepped place. For example, the map generation unit 108 may calculate the degree of dangerousness based on attribute information (narrowness of the width, angle of a slope, and the like), and may change a color or a display pattern in accordance with the degree of danger so as to display a map which allows the degree of dangerousness to be visually recognized. As in marathon, in a case where the surveillance target area moves along with time, the surveillance target area which changes along with time may be displayed together on a map. In this case, for example, a manager of the surveillance system predicts positions to which participants and staff of an event move with the progress of the event, and previously defines a function of identifying a surveillance target area which is displayed along with time, based on this prediction. The map generation unit 108 acquires a surveillance target area based on the predefined function by using time as a parameter, and displays the acquired surveillance target area on a map. Alternatively, the map generation unit 108 can grasp the surveillance target area in accordance with position information of the leading person of the event (in a case of marathon, security guards or guides at the leading and the last). Specifically, the map generation unit 108 may acquire position information of the leading person of an event. The map generation unit 108 may grasp the surveillance target area based on the position information and display the grasped surveillance target area on a map.

[Hardware Configuration]

The center apparatus 10 in this example embodiment has a hardware configuration similar to FIG. 2. The storage 1003 further stores programs for realizing respective functions of the processing units (position information acquisition unit 104, position conversion unit 107, and map generation unit 108) in this example embodiment. The processor 1001 executes the programs so as to realize the processing units in this example embodiment.

Operation Example

Figure 14:
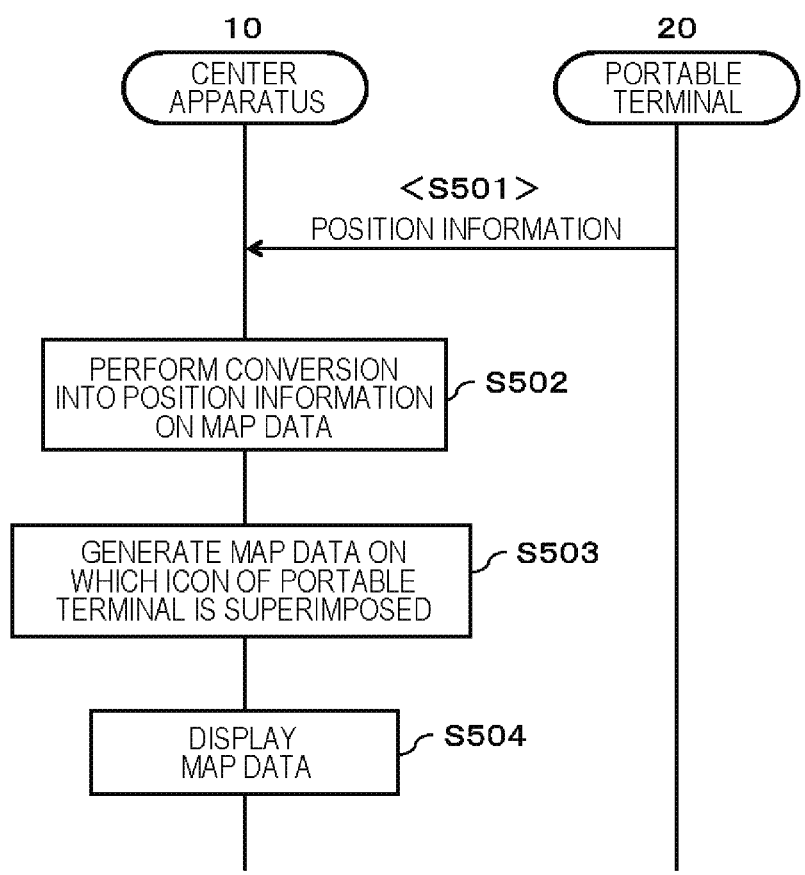
FIG. 14 is a flowchart illustrating a flow of processing of the surveillance system in the third example embodiment.

An operation example of the surveillance system 1 in this example embodiment will be described with reference to FIG. 14. FIG. 14 is a sequence diagram illustrating a flow of processing of the surveillance system 1 in the third example embodiment.

The portable terminal 20 which has transmitted participation consent transmits the own position information, for example, at a predetermined interval (S501). When the position information acquisition unit 104 acquires the position information of the portable terminal 20 which has transmitted the participation consent, the position conversion unit 107 converts the acquired position information into position information on map data, by using the conversion function which has been previously held (S502). The map generation unit 108 generates map data on which an icon I indicating the position of the portable terminal 20 which has transmitted the participation consent is superimposed, by using the position information on map data, which has been obtained in S502, as illustrated in FIG. 13 (S503). The map generation unit 108 displays the generated map data in the display unit of the center apparatus 10 so as to provide the map data to the surveillance operator (S504).

As described above, according to this example embodiment, the surveillance operator can recognize distribution of portable terminals 20 which have transmitted the participation consent in the place to be surveilled such as an event venue, at a glance. Thus, the surveillance operator can easily determine which part of the place should be enhanced in surveillance, for example.

Fourth Example Embodiment

In this example embodiment, a form in which a center apparatus 10 collects an image captured by a portable terminal 20 which has transmitted participation consent will be described.

[Processing Configuration]

Figure 15:
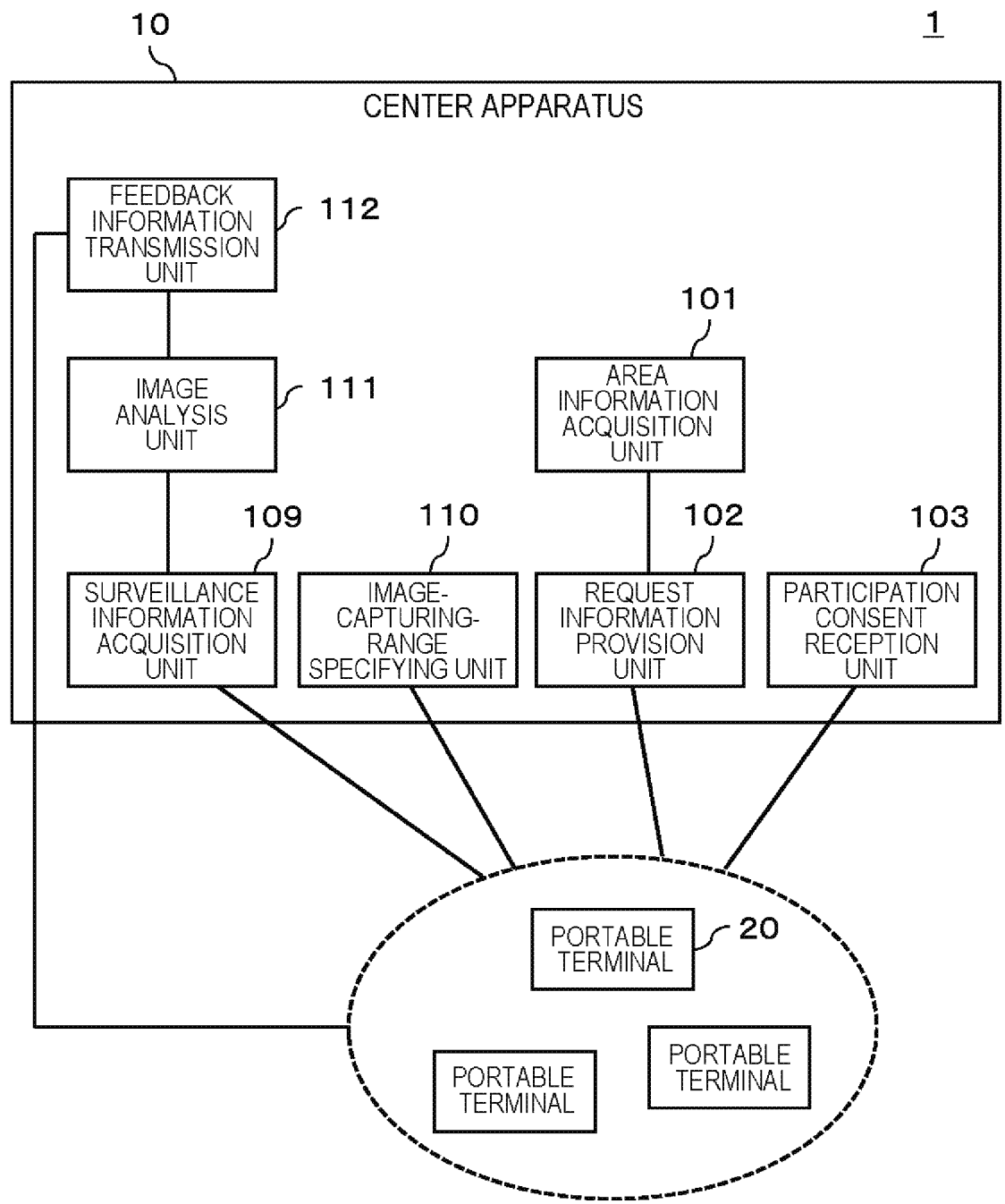
FIG. 15 is a diagram conceptually illustrating a processing configuration of a surveillance system according to a fourth example embodiment.

FIG. 15 is a diagram conceptually illustrating a processing configuration of a surveillance system 1 in a fourth example embodiment. As illustrated in FIG. 15, the center apparatus 10 further includes a surveillance information acquisition unit 109, an image-capturing-range specifying unit 110, an image analysis unit 111, and a feedback information transmission unit 112.

The surveillance information acquisition unit 109 acquires a surveillance image captured by the portable terminal 20 which has transmitted the participation consent, from the portable terminal 20. Specifically, the portable terminal 20 which has transmitted the participation consent captures an image (surveillance image) of the surveillance-desired area by using the image capturing unit provided in the portable terminal 20, and transmits the image to the surveillance information acquisition unit 109. It should be noted that, the image transmitted from the portable terminal 20 may be a motion image or a still image.

Here, the surveillance image captured by the portable terminal 20 is captured by a person who normally is not involved in surveillance work. Thus, a surveillance image desired by the surveillance operator may not be acquired. Thus, in this example embodiment, an image-capturing-range specifying unit 110 is included. The image-capturing-range specifying unit 110 informs the user of the portable terminal 20 about an image capturing range or an image capturing direction desired by the surveillance operator. The image-capturing-range specifying unit 110 transmits information specifying an image capturing range or an image capturing direction of a surveillance image, to the portable terminal 20 which has transmitted the participation consent. Specifically, the surveillance operator inputs, for example, instruction information such as "please capture subject A", or "please capture the entrance direction", by using the image-capturing-range specifying unit 110. The instruction information is transmitted to the portable terminal 20 which captures a surveillance image of a target. The user of the portable terminal 20 adjusts the image capturing range or the image capturing direction based on the information received from the image-capturing-range specifying unit 110, and thus a surveillance image desired by the operator can be acquired by the surveillance information acquisition unit 109. The image-capturing-range specifying unit 110 may further receive specification of a range for transmitting instruction information, and transmit the instruction information to portable terminals 20 present in the specified range, based on pieces of position information of the portable terminals 20.

The image analysis unit 111 analyzes a capturing state of a surveillance image acquired by the surveillance information acquisition unit 109, by using a known image analysis algorithm. The "capturing state of a surveillance image" includes, for example, the degree of blurring of an image, a result of recognizing a subject in a surveillance image, an image capturing direction of an image based on the captured background or electronic compass information, white balance of an image, and the like.

The feedback information transmission unit 112 transmits feedback information to the portable terminal 20 which has captured the surveillance image analyzed by the image analysis unit 111. Here, the "feedback information" includes incentive information for the user of the portable terminal 20 which has transmitted a useful surveillance image, or instruction information notifying the user of the portable terminal 20 of an instruction (for example, instruction of a desired image capturing range or a desired image capturing direction) in order to obtain a more useful surveillance image.

For example, the incentive information is benefit information for improving motivation of a user, such as a membership point or a coupon of a partner company. The feedback information transmission unit 112 may rank surveillance images and transmit incentive information depending on the rank to the corresponding portable terminal 20. The ranking is performed in accordance with an analysis result of the surveillance image by the image analysis unit 111 (for example, a case where blurring is small, a case where an image of a desired subject is captured, a case where image capturing is performed in an appropriate direction, a case where brightness is within an easy viewing range, and the like). The feedback information transmission unit 112 may receive an input of selecting a useful surveillance image from the surveillance operator, and transmit incentive information to the portable terminal 20 which has captured the selected surveillance image. The feedback information transmission unit 112 generates instruction information (for example, a message indicating that "please let camera shake prevention function turn ON", and the like) for correcting a problem of a captured image from an analysis result of the surveillance image by the image analysis unit 111. The feedback information transmission unit 112 transmits the generated instruction information to the portable terminal 20.

[Hardware Configuration]

The center apparatus 10 in this example embodiment has a hardware configuration similar to FIG. 2. The storage 1003 further stores programs of realizing respective functions of the processing units (surveillance information acquisition unit 109, image analysis unit 111, and feedback information transmission unit 112) in this example embodiment. The processor 1001 executes the programs so as to realize the processing units in this example embodiment.

Operation Example

Figure 16:
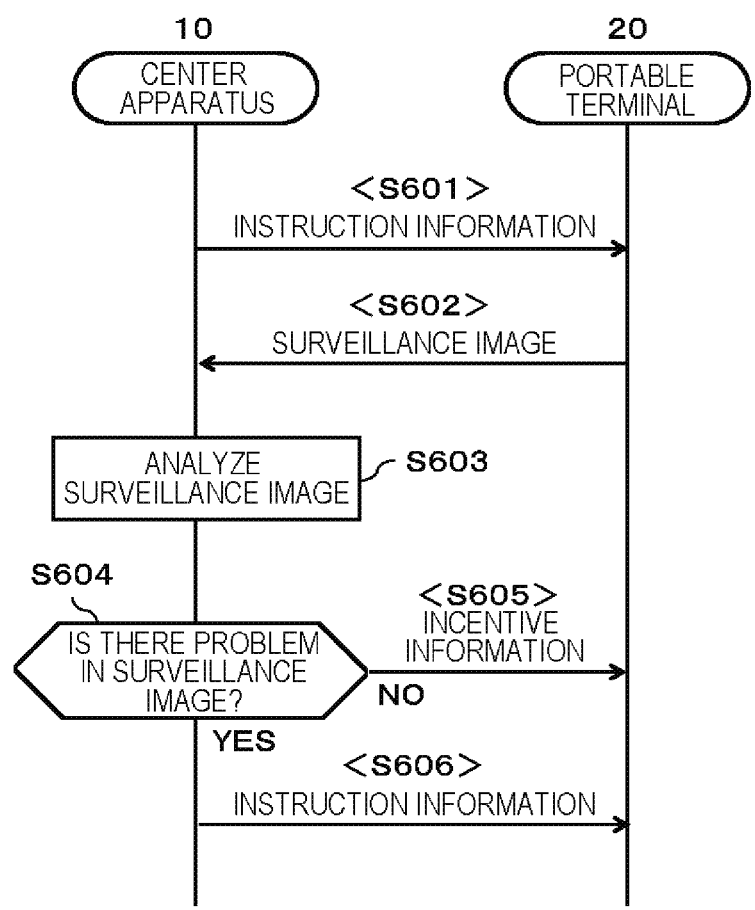
FIG. 16 is a flowchart illustrating a flow of processing of a surveillance system in the fourth example embodiment.

An operation example of the surveillance system 1 in this example embodiment will be described with reference to FIG. 16. FIG. 16 is a sequence diagram illustrating a flow of processing of the surveillance system 1 in the fourth example embodiment.

Firstly, the image-capturing-range specifying unit 110 transmits instruction information of an image capturing range or an image capturing direction to a portable terminal 20 in accordance with an input of the instruction information by the surveillance operator (S601). The portable terminal 20 displays the received instruction information to the user of the portable terminal 20. The user of the portable terminal 20 transmits an image captured in accordance with the instruction information, to the center apparatus 10 (S602). When the surveillance information acquisition unit 109 acquires a surveillance image transmitted from the portable terminal 20, the image analysis unit 111 analyzes a capturing state of the acquired surveillance image (S603). The feedback information transmission unit 112 receives an analysis result of the image analysis unit 111 and determines whether or not there is a problem in the surveillance image (S604). For example, the criterion of the capturing state which is used for determining whether or not there is a problem in the surveillance image is preset in the feedback information transmission unit 112. The feedback information transmission unit 112 compares the criterion to the analysis result, and thus determines goodness or badness of the surveillance image acquired in S602. As a result of the determination, in a case where there is no problem in the surveillance image (NO in S604), the feedback information transmission unit 112 transmits predetermined incentive information to the portable terminal 20 which has captured the surveillance image (S605). Here, the feedback information transmission unit 112 may rank the surveillance image when determination of the analysis result is performed, and transmit the incentive information in accordance with the rank. On the other hand, in a case where there is a problem in the surveillance image (YES in S604), the feedback information transmission unit 112 generates instruction information for solving the problem, and transmits the generated instruction information to the portable terminal 20 which has captured the surveillance image (S606). The series of processes is performed every time a surveillance image is acquired from a portable terminal 20.

As described above, in this example embodiment, a surveillance image captured by the image capturing unit of a portable terminal 20 which has transmitted participation consent is acquired. Thus, it is possible to collect pieces of information required for performing surveillance work, by the surveillance operator, from a portable terminal 20 which has transmitted participation consent. In a case where a plurality of portable terminals 20 participate, it is possible to obtain surveillance image at various angles and to improve accuracy of the surveillance work.

In this example embodiment, a surveillance image transmitted to the center apparatus 10 side is analyzed, and feedback information depending on the result is transmitted to the portable terminal 20. Specifically, feedback of incentive information is transmitted to the user of the portable terminal 20 which has captured an image which is useful for the surveillance work. Feedback of instruction information is transmitted to the user of the portable terminal 20 which has captured an image which has difficulty in being used in the surveillance work, in order to capture a useful surveillance image. Accordingly, an effect of improving a user's motivation for transmitting a useful surveillance image and an effect of improving a probability of obtaining a useful surveillance image are obtained.

In this example embodiment, a component (incentive information transmission unit) which operates so as to transmit incentive information to a portable terminal which has transmitted a surveillance image may be further provided. In this case, specifically, when the surveillance information acquisition unit 109 acquires a surveillance image in S602, the incentive information transmission unit transmits incentive information to the portable terminal 20 which has transmitted the surveillance image. Since the surveillance image is transmitted, and thus the incentive information is received, it is possible to expect that the user of the portable terminal 20 which has transmitted the participation consent actively transmits the surveillance image.

Fifth Example Embodiment

In this example embodiment, a form in which a portable terminal 20 which has transmitted participation consent detects a predetermined image area from an image captured by the image capturing unit of the own portable terminal, and transmits the detected image area to the center apparatus 10 will be described.

[Processing Configuration]

Figure 17:
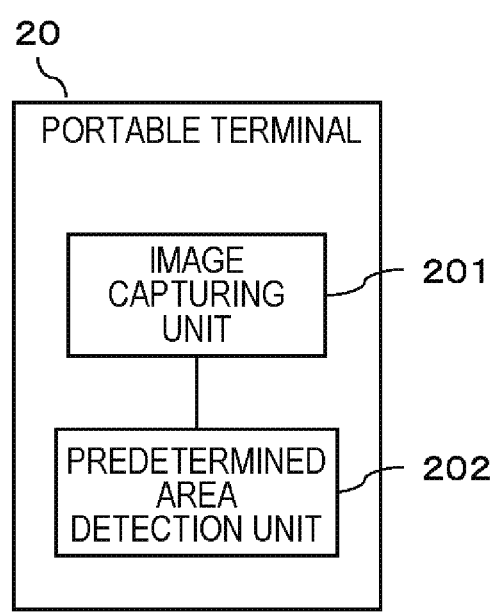
FIG. 17 is a diagram conceptually illustrating a processing configuration of a surveillance system according to a fifth example embodiment.

FIG. 17 is a diagram conceptually illustrating a processing configuration of a surveillance system 1 in a fifth example embodiment. As illustrated in FIG. 17, a portable terminal 20 in this example embodiment includes an image capturing unit 201 and a predetermined area detection unit 202.

The image capturing unit 201 is a device which includes a lens and an imaging element such as a charge coupled device (CCD) image sensor, and is capable of capturing an image (motion image or still image) of the surroundings.

The predetermined area detection unit 202 detects a predetermined image area from a surveillance image. The predetermined area detection unit 202 detects, for example, an area of a person in an image, an area of a predetermined part (for example, face area) of a person, or an area in which movement occurs in an image, and the like, and extracts the areas as a "predetermined image area". The surveillance information acquisition unit 109 acquires the predetermined image area extracted by the predetermined area detection unit 202. A program extracting a predetermined image area is stored in a storage (not illustrated) of the portable terminal 20 and the predetermined area detection unit 202 is realized by the program being executed by a processor (not illustrated) of the portable terminal 20.

Operation Example

Figure 18:
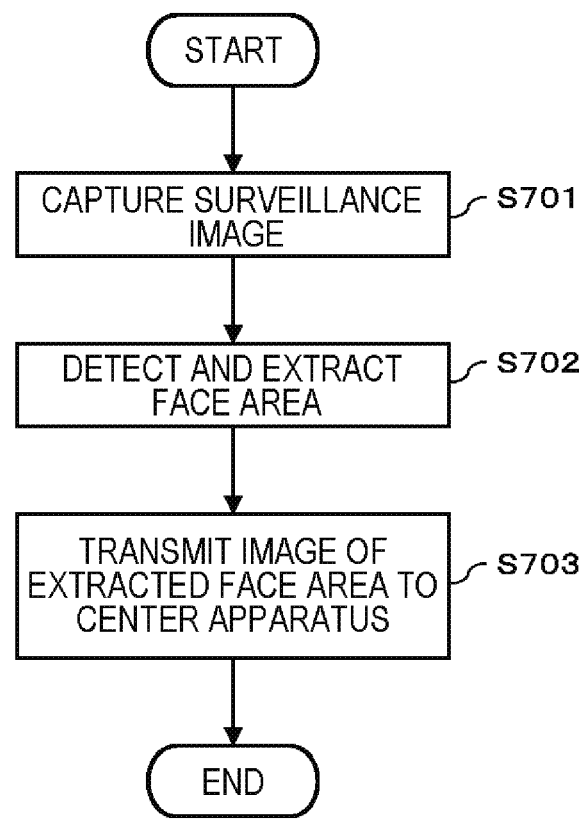
FIG. 18 is a flowchart illustrating a flow of processing in the fifth example embodiment.

An operation example of the surveillance system 1 in this example embodiment will be described with reference to FIG. 18. FIG. 18 is a flowchart illustrating a flow of processing of the fifth example embodiment. It should be noted that, an example in which a face area of a person is detected will be described below.

Firstly, the image capturing unit 201 captures a surveillance image (S701). An image processing unit 203 detects a face area from an image captured by the image capturing unit 201 (S702). The image processing unit 203 transmits the detected face area to the center apparatus 10 (S703). Note that, in the center apparatus 10, face comparison processing is performed by using the face area received in S703. Specifically, an image processing unit (not illustrated) of the center apparatus 10 extracts an image feature value from the face area received in S703, and compares the extracted image feature value to data for comparison (feature value and the like of a face image of a surveillance target person). The image processing unit of the center apparatus 10 provides a processing result of, for example, whether or not a person as a target of surveillance is present, to the surveillance operator.

As described above, in this example embodiment, the surveillance image captured by the portable terminal 20 is transmitted to the center apparatus 10 in a state of being subjected to preprocessing for image processing performed in the center apparatus 10. Thus, according to this example embodiment, it is possible to reduce a load on processing of a surveillance image on the center apparatus 10 side.

Sixth Example Embodiment

In this example embodiment, a form in which a portable terminal 20 which has transmitted participation consent performs predetermined image processing on an image captured by the image capturing unit of the own portable terminal, and transmits a result to the center apparatus 10 will be described.

Figure 19:
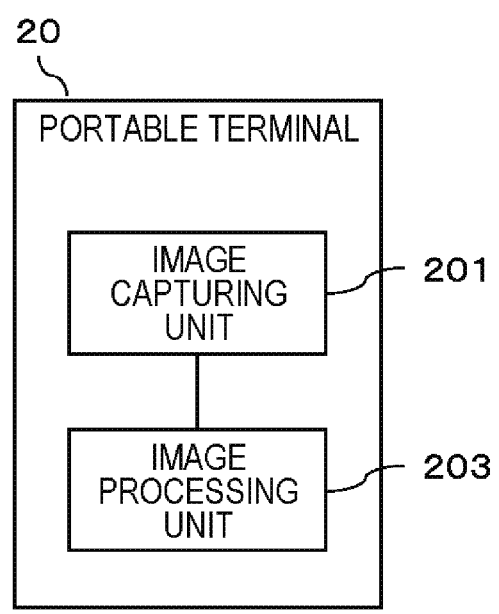
FIG. 19 is a diagram conceptually illustrating a processing configuration of a surveillance system according to a sixth example embodiment.

FIG. 19 is a diagram conceptually illustrating a processing configuration of a surveillance system 1 in a sixth example embodiment. As illustrated in FIG. 19, a portable terminal 20 in this example embodiment includes the image capturing unit 201 and the image processing unit 203, which are the same as those of the fifth example embodiment.

The image processing unit 203 performs image processing on a surveillance image. The image processing unit 203 performs, for example, image processing such as calculating the degree of congestion or a flow of people from the captured image, or face comparison processing of a person included in the captured image. The surveillance information acquisition unit 109 acquires a result obtained by image processing of the image processing unit 203. A program performing predetermined image processing is stored in a storage (not illustrated) of the portable terminal 20 and the image processing unit 203 is realized by the program being executed by a processor (not illustrated) of the portable terminal 20.

Operation Example

Figure 20:
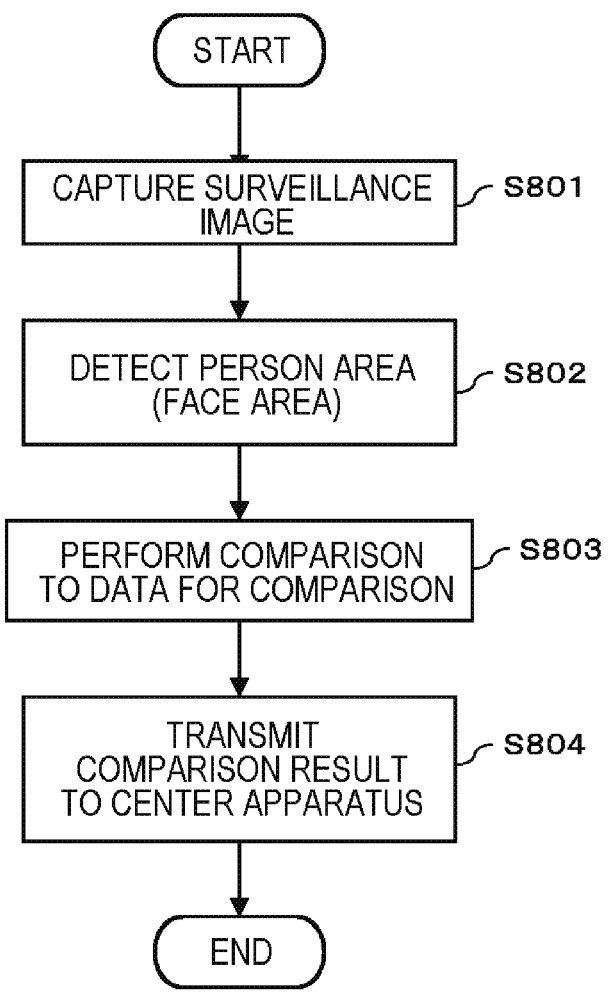
FIG. 20 is a flowchart illustrating a flow of processing in the sixth example embodiment.

An operation example of the surveillance system 1 in this example embodiment will be described with reference to FIG. 20. FIG. 20 is a flowchart illustrating a flow of processing of the sixth example embodiment. Note that, an example of transmitting a result of face comparison of a person will be described below.

Firstly, the image capturing unit 201 captures a surveillance image (S801). The image processing unit 203 detects a person area (or face area) from an image captured by the image capturing unit 201 (S802). The image processing unit 203 extracts an image feature value of the detected person area (or face area), and compares the extracted image feature value with data for comparison (data including an image feature value and the like of a person as a target of surveillance) which has been previously held (S803). The image processing unit 203 transmits a result (whether or not a person of data for comparison is present) obtained by comparison to the data for comparison, to the center apparatus 10 (S804). Here, the image processing unit 203 may further transmit a person area (or face area) which matches with the data for comparison, along with the comparison result, to the center apparatus 10. The surveillance operator can easily determine whether or not a person as a target of surveillance is present, by the comparison result received in S804.

As described above, in this example embodiment, a result of image processing performed in the portable terminal 20 is transmitted to the center apparatus 10, and is used for surveillance work of the surveillance operator. Thus, according to this example embodiment, it is possible to reduce a load on processing of a surveillance image on the center apparatus 10 side.

Seventh Example Embodiment

When a general person who expresses participation in surveillance work captures an image for surveillance by using a portable terminal 20 in an event venue and the like in which image capturing is prohibited, the capturing may be recognized as a suspicious behavior, to the surroundings. In a case where a general person who expresses participation in surveillance captures an image for surveillance by using a portable terminal 20, there is a probability of having trouble with other surrounding persons. In this example embodiment, a surveillance system 1 which has a configuration for preventing an occurrence of such a problem will be described.

[Processing Configuration]

Figure 21:
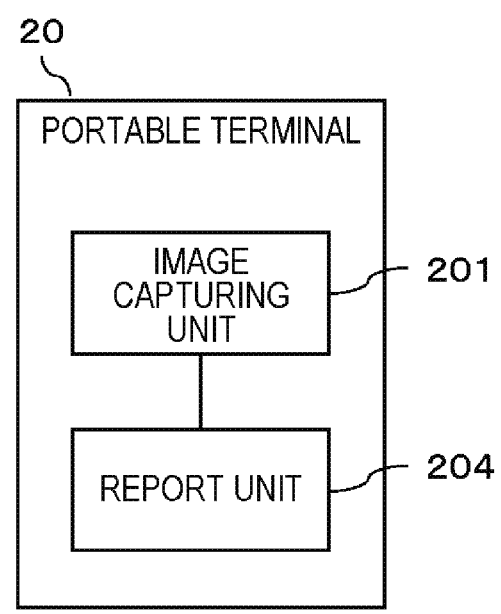
FIG. 21 is a diagram conceptually illustrating a processing configuration of a surveillance system according to a seventh example embodiment.

FIG. 21 is a diagram conceptually illustrating a processing configuration of a surveillance system 1 in a seventh example embodiment. As illustrated in FIG. 21, a portable terminal 20 in this example embodiment further includes an image capturing unit 201 and a report unit 204. The present invention is not limited thereto, and the portable terminal 20 in this example embodiment may further include the components in the fifth example embodiment or the sixth example embodiment.

When a portable terminal which has transmitted participation consent captures a surveillance image, the report unit 204 outputs a predetermined report for indicating that the portable terminal captures a surveillance image, to an outside. Specific examples of "an output of a predetermined report" include an example in which a screen of a portable terminal 20 or a lighting device including a light emitting diode (LED) and the like is lit on and off in a predetermined pattern, an example in which a predetermined message (for example, "image capturing is in progress based on consignment of surveillance work" and the like) is displayed on a screen of the portable terminal 20, an example in which a sound for reporting a message indicating that image capturing is in progress based on consignment of surveillance work is output from a sound output unit of the portable terminal 20, and the like. In this case, the display device, the sound output device, or the lighting device which are included in the portable terminal 20 function as the report unit 204. The present invention is not limited thereto, and the report unit 204 may be a lighting device (LED light and the like), a speaker device, or the like which is attachable to the portable terminal 20. The devices may be dedicated devices, for example, which are rented at an entrance or the like of an event venue to a general person from whom participation consent has been obtained after checking beforehand participation or non-participation in surveillance work of the person. The devices may be commercial devices purchased by an individual person.

A storage (not illustrated) of the portable terminal 20 stores a program transmitting a control command which indicates an output of a predetermined report, to the report unit 204 according to the image capturing unit 201 capturing an image. A processor (not illustrated) of the portable terminal 20 executes the program, and thus the program transmits a control command for performing an output of a predetermined report, to the report unit 204 in a case where an image is captured by the image capturing unit 201. The report unit 204 outputs a predetermined report in accordance with the control command.

Operation Example

Figure 22:
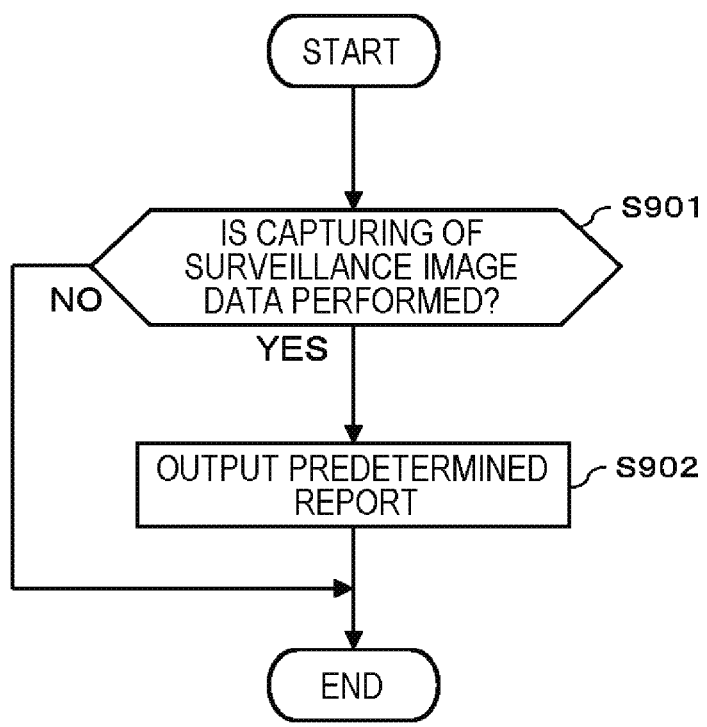
FIG. 22 is a flowchart illustrating a flow of processing of a surveillance system in the seventh example embodiment.

An operation example of the surveillance system 1 in this example embodiment will be described with reference to FIG. 22. FIG. 22 is a flowchart illustrating a flow of processing of the surveillance system 1 in the seventh example embodiment.

The report unit 204 determines whether or not capturing of a surveillance image is performed in the image capturing unit 201 of the portable terminal 20 (S901). In a case where a surveillance image is captured by the image capturing unit 201 of the portable terminal 20 (YES in S901), the report unit 204 receives a control command from the processor of the portable terminal 20 and performs a predetermined report output (lighting on and off of a screen of the portable terminal 20, displaying of a predetermined message on a screen of the portable terminal 20, and the like) (S902). On the other hand, in a case where a surveillance image is not captured by the image capturing unit 201 of the portable terminal 20 (NO in S901), a control command is not transmitted from the processor of the portable terminal 20, until a surveillance image is captured. Thus, the report unit 204 does not perform the predetermined report output.

As described above, in this example embodiment, in a case where a surveillance image is captured by the image capturing unit of the portable terminal 20, a control command from the processor of the portable terminal 20 is output to the report unit 204, and the predetermined report output is performed by the report unit 204. Thus, according to this example embodiment, it is possible to inform the surrounding persons about a message that a person who captures an image by using a portable terminal 20 performs the capturing behavior based on the valid reason. As a result, an effect of preventing an occurrence of a situation in which a general person who expresses participation in surveillance work participates in the surveillance work, and thus has troubles with the surrounding persons is obtained. Even in a case where the troubles occur, it is possible to expect an effect of easily solving the trouble by a report output of the report unit 204.

Note that, here, an example in which the predetermined report output is performed when a surveillance image is captured. However, the example embodiment is not limited to the example described here. For example, a form in which the report unit 204 performs the predetermined report output in a case where participation consent is transmitted from the portable terminal 20 or in a case where an external report unit 204 is mounted in the portable terminal 20 is also included in the range of this example embodiment.

Hitherto, the example embodiments of the present invention are described with reference to the drawings. However, the example embodiments are just examples of the present invention, and various configurations other than the above example embodiments can be employed.

A plurality of processes are described in order in the flowcharts or the sequence diagrams which are used in the above descriptions. However, the order of performing a process, which is applied to each of the example embodiments is not limited to the order described therein. In each of the example embodiments, the order of the illustrated processes can be changed in a range without hindrance in contents. The above-described example embodiments can be combined in a range in which the contents do not conflict with each other.

Examples of reference forms are noted below.

1. A surveillance system including:
an area information acquisition unit that acquires information of a surveillance-desired area,
a request information provision unit that provides participation request information for surveillance that is conducted by using an image capturing unit of a portable terminal in the surveillance-desired area, and
a participation consent reception unit that receives participation consent as a response to the participation request information, from the portable terminal.

2. The surveillance system described in 1., further including:
a position information acquisition unit that acquires position information of each portable terminal, and
a terminal identification unit that identifies a portable terminal present in the surveillance-desired area, based on the acquired position information,
in which the request information provision unit displays the participation request information in a display unit of the identified portable terminal.

3. The surveillance system described in 1., further including:
a display-equipment identification unit that identifies display equipment installed in a place corresponding to the surveillance-desired area,
in which the request information provision unit displays the participation request information in the identified display equipment, and
the participation request information includes information for access to a unit that transmits the participation consent from the portable terminal.

4. The surveillance system described in 1., further including:
a position information acquisition unit that acquires position information of each portable terminal,
in which the request information provision unit
transmits drawing data of a Web page to the portable terminal in response to a Web page display request from the portable terminal, and
causes the participation request information to be included in the drawing data of the Web page, which is transmitted to the portable terminal, in a case where position information of the portable terminal which has transmitted the Web page display request indicates a place corresponding to the surveillance-desired area.

5. The surveillance system described in any one of 1. to 4., further including:
a position information acquisition unit that acquires position information of each portable terminal,
a position conversion unit that converts the acquired position information of the portable terminal into position information on map data of an area which includes the surveillance-desired area, and
a map generation unit that generates map data indicating a position of the portable terminal which has transmitted the participation consent, in the area, by using the converted position information of the portable terminal.

6. The surveillance system described in any one of 1. to 5., further including:
a surveillance information acquisition unit that acquires a surveillance image captured by the portable terminal which has transmitted the participation consent, from the portable terminal.

7. The surveillance system described in 6., further including:
an incentive information transmission unit that transmits incentive information to the portable terminal which has transmitted the surveillance image.

8. The surveillance system described in 6. or 7., further including:
a capturing range specifying unit that transmits information specifying an image capturing range or an image capturing direction of the surveillance image to the portable terminal which has transmitted the participation consent.

9. The surveillance system described in any one of 6. to 8., further including:

an image analysis unit that analyzes the acquired surveillance image, and a feedback information transmission unit that transmits feedback information to the portable terminal which has captured the analyzed surveillance image, in accordance with a result of the analysis.

10. The surveillance system described in 9., in which the feedback information includes at least one of incentive information for the portable terminal which has captured the analyzed surveillance image, and information of a notification of an image capturing range or an image capturing direction desired for the portable terminal which has captured the analyzed surveillance image.

11. The surveillance system described in any one of 6. to 10., further including:

a report control unit that outputs a predetermined report for indicating that the portable terminal captures a surveillance image, to an outside, when the portable terminal which has transmitted the participation consent captures the surveillance image.

12. The surveillance system described in any one of 6. to 11., further including:

a predetermined area detection unit that detects a predetermined image area in the surveillance image, in which the surveillance information acquisition unit acquires the predetermined image area detected in the surveillance image.

13. The surveillance system described in any one of 6. to 11., further including:

an image processing unit that performs image processing on the surveillance image, in which the surveillance information acquisition unit acquires a result of the image processing.

14. A surveillance network construction method executed by a computer, the method including:

acquiring information of a surveillance-desired area, providing participation request information for surveillance that is conducted by using an image capturing unit of a portable terminal in the surveillance-desired area, and receiving participation consent as a response to the participation request information, from the portable terminal.

15. The surveillance network construction method executed by the computer, described in 14., further including:

acquiring position information of each portable terminal, identifying a portable terminal present in the surveillance-desired area, based on the acquired position information, and displaying the participation request information in a display unit of the identified portable terminal.

16. The surveillance network construction method executed by the computer, described in 14., further including:

identifying display equipment installed in a place corresponding to the surveillance-desired area, display the participation request information in the identified display equipment, and including information for access to a unit that transmits the participation consent from the portable terminal.

17. The surveillance network construction method executed by the computer, described in 14., further including:

acquiring position information of each portable terminal, transmitting drawing data of a Web page to the portable terminal in response to a Web page display request from the portable terminal, and causing the participation request information to be included in the drawing data of the Web page, which is transmitted to the portable terminal, in a case where position information of the portable terminal which has transmitted the Web page display request indicates a place corresponding to the surveillance-desired area.

18. The surveillance network construction method executed by the computer, described in any one of 14. to 17., further including:

acquiring position information of each portable terminal, converting the acquired position information of the portable terminal into position information on map data of an area which includes the surveillance-desired area, and generating map data indicating a position of the portable terminal which has transmitted the participation consent, in the area, by using the converted position information of the portable terminal.

19. The surveillance network construction method executed by the computer, described in any one of 14. to 18., further including:

acquiring a surveillance image captured by the portable terminal which has transmitted the participation consent, from the portable terminal.

20. The surveillance network construction method executed by the computer, described in 19., further including:

transmitting incentive information to the portable terminal which has transmitted the surveillance image.

21. The surveillance network construction method executed by the computer, described in 19. or 20., further including:

transmitting information specifying an image capturing range or an image capturing direction of the surveillance image to the portable terminal which has transmitted the participation consent.

22. The surveillance network construction method executed by the computer, described in any one of 19. to 21., further including:

analyzing the acquired surveillance image, and transmitting feedback information to the portable terminal which has captured the analyzed surveillance image, in accordance with a result of the analysis.

23. The surveillance network construction method described in 22., in which the feedback information includes at least one of incentive information for the portable terminal which has captured the analyzed surveillance image, and information of a notification of an image capturing range or an image capturing direction desired for the portable terminal which has captured the analyzed surveillance image.

24. The surveillance network construction method described in any one of 19. to 23., in which a predetermined report for indicating that the portable terminal captures a surveillance image, to an outside, is output when the portable terminal which has transmitted the participation consent captures the surveillance image.

25. The surveillance network construction method described in any one of 19. to 24., further including:

causing the portable terminal to detect a predetermined image area in the surveillance image, and causing the computer to acquire the predetermined image area detected in the surveillance image by the portable terminal.

26. The surveillance network construction method described in any one of 19. to 24., further including:

causing the portable terminal to perform image processing on the surveillance image, and causing the computer to acquire a result of the image processing performed by the portable terminal.

27. A program causing a computer to function as:

an area information acquisition unit that acquires information of a surveillance-desired area, a request information provision unit that provides participation request information for surveillance that is conducted by using an image capturing unit of a portable terminal in the surveillance-desired area, and a participation consent reception unit that receives participation consent as a response to the participation request information, from the portable terminal.

28. The program described in 27., further causing the computer to function as:

a position information acquisition unit that acquires position information of each portable terminal, a terminal identification unit that identifies a portable terminal present in the surveillance-desired area, based on the acquired position information, and a unit that is the request information provision unit and displays the participation request information in a display unit of the identified portable terminal.

29. The program described in 27., further causing the computer to function as:

a display-equipment identification unit that identifies display equipment installed in a place corresponding to the surveillance-desired area, and a unit that is the request information provision unit and displays the participation request information including information for access to a unit that transmits the participation consent from the portable terminal, in the identified display equipment.

30. The program described in 27., further causing the computer to function as:

a position information acquisition unit that acquires position information of each portable terminal, and a unit that is the request information provision unit, transmits drawing data of a Web page to the portable terminal in response to a Web page display request from the portable terminal, and causes the participation request information to be included in the drawing data of the Web page, which is transmitted to the portable terminal, in a case where position information of the portable terminal which has transmitted the Web page display request indicates a place corresponding to the surveillance-desired area.

31. The program described in any one of 27. to 30., further causing the computer to function as:

a position information acquisition unit that acquires position information of each portable terminal, a position conversion unit that converts the acquired position information of the portable terminal into position information on map data of an area which includes the surveillance-desired area, and a map generation unit that generates map data indicating a position of the portable terminal which has transmitted the participation consent, in the area, by using the converted position information of the portable terminal.

32. The program described in any one of 27. to 31., further causing the computer to function as:

a surveillance information acquisition unit that acquires a surveillance image captured by the portable terminal which has transmitted the participation consent, from the portable terminal.

33. The program described in 32., further causing the computer to function as:

an incentive information transmission unit that transmits incentive information to the portable terminal which has transmitted the surveillance image.

34. The program described in 32. or 33., further causing the computer to function as:

a capturing range specifying unit that transmits information specifying an image capturing range or an image capturing direction of the surveillance image to the portable terminal which has transmitted the participation consent.

35. The program described in any one of 32. to 34., further causing the computer to function as:

an image analysis unit that analyzes the acquired surveillance image, and a feedback information transmission unit that transmits feedback information to the portable terminal which has captured the analyzed surveillance image, in accordance with a result of the analysis.

36. The program described in 35., in which the feedback information includes at least one of incentive information for the portable terminal which has captured the analyzed surveillance image, and information of a notification of an image capturing range or an image capturing direction desired for the portable terminal which has captured the analyzed surveillance image.

37. A program causing a portable terminal that communicates with a computer that executes the program described in any one of 32. to 36. to function as:

a report control unit that outputs a predetermined report for indicating that the portable terminal captures a surveillance image, to an outside, when the portable terminal captures the surveillance image.

38. The program described in 37., further causing the portable terminal to function as:

a predetermined area detection unit that detects a predetermined image area in the surveillance image, and a unit that transmits the predetermined image area detected in the surveillance image.

39. The program described in 37., further causing the portable terminal to function as:

an image processing unit that performs image processing on the surveillance image, and a unit that transmits a result of the image processing.

The invention claimed is:

1. An event surveillance system for surveillance of an event, comprising:

a wearable camera worn by a security guard;

at least one display device; and at least one processor configured to:

acquire information of a surveillance-desired area;

acquire position information of smartphones owned by people who do not fall under the security guard, based on at least one of Global Positioning System (GPS) and an access point of Wireless Fidelity (Wi-Fi);

transmit, to a smartphone, among the smartphones, participation request information that represents a request for participation of surveillance with use of a camera of the smartphone in a surveillance-desired area, based on the acquired position information;

receive participation consent which represents an affirmative response to the participation request information, from the smartphone, the participation consent being sent when a user of the smartphone takes an action to participate in the surveillance in the surveillance-desired area;

perform a face comparison for people involved in the event; and cause the at least one display device to display at least one of:
an image captured by the wearable camera;
an image captured by the smartphone; and
a result of the face comparison, wherein the at least one processor is further configured to:
cause the smartphone that has transmitted the participation consent to run a program that causes the smartphone to control an output device equipped in the smartphone such that, while the smartphone is used for capturing an image for the surveillance, the output device convey to surrounding people that image capturing by the smartphone is in progress based on consignment of surveillance work.

2. The event surveillance system according to claim 1, wherein at the least one processor is configured to:
transmit the participation request information to a smartphone that is present in the surveillance-desired area.

3. The event surveillance system according to claim 1, wherein the at least one processor is further configured to:
receive a moving image from the smartphone that has transmitted the participation consent;
cause the at least one display device to display the received moving image; and
transmit, to a person holding the smartphone, an instruction to the person from an operator who watches the displayed moving images.

4. The event surveillance system according to claim 1, wherein
the event venue is a marathon venue,
the at least one processor is further configured to determine a surveillance-target area, based on location information of at least one person at front or end of runners, the at least one person being a security guard or a guide involved in the marathon, and
the surveillance-desired area is determined from within the surveillance-target area.

5. The event surveillance system according to claim 1, wherein the at least one processor is further configured to:
transmit incentive information to the smartphone that has transmitted the participation consent.

6. The event surveillance system according to claim 5, wherein the at least one processor is further configured to:
receive input of selecting a surveillance image, among surveillance images received from smartphones, each of which has transmitted the participation consent, the surveillance image being selected as an useful surveillance image by an operator who watches the surveillance images; and
transmit the incentive information to the smartphone that has captured the selected surveillance image.

7. The event surveillance system according to claim 1, wherein the at least one processor is further configured to:
cause the at least one display device to display, on an image of the event venue based on the position information, positions of the smartphones and a heat map indicating distribution of degree of congestion; and
acquire the information of the surveillance-desired area by receiving an input of designation of the surveillance-desired area, the surveillance-desired area being designated based on the displayed positions and the displayed heat map.

8. An event surveillance method for surveillance of an event, comprising:
acquiring information of a surveillance-desired area;
acquiring position information of smartphones owned by people who do not fall under the security guard, based on at least one of Global Positioning System (GPS) and an access point of Wireless Fidelity (Wi-Fi);
transmitting, to a smartphone, among the smartphones, participation request information that represents a request for participation of surveillance with use of a camera of the smartphone in a surveillance-desired area, based on the acquired position information;
receiving participation consent which represents an affirmative response to the participation request information, from the smartphone, the participation consent being sent when a user of the smartphone takes an action to participate in the surveillance in the surveillance-desired area;
performing a face comparison for people involved in the event;
causing an at least one display device to display at least one of:
an image captured by a wearable camera worn by a security guard;
an image captured by the smartphone; and
a result of the face comparison, and
causing the smartphone that has transmitted the participation consent to run a program that causes the smartphone to control an output device equipped in the smartphone such that, while the smartphone is used for capturing an image for the surveillance, the output device convey to surrounding people that image capturing by the smartphone is in progress based on consignment of surveillance work.

9. The event surveillance method according to claim 8, comprising:
transmitting the participation request information to a smartphone that is present in the surveillance-desired area.

10. The event surveillance method according to claim 8, further comprising:
receiving a moving image from the smartphone that has transmitted the participation consent;
causing the at least one display device to display the received moving image; and
transmitting, to a person holding the smartphone, an instruction to the person from an operator who watches the displayed moving images.

11. The event surveillance method according to claim 8, wherein
the event venue is a marathon venue,
the event surveillance method further comprises determining a surveillance-target area, based on location information of at least one person at front or end of runners, the at least one person being a security guard or a guide involved in the marathon, and
the surveillance-desired area is determined from within the surveillance-target area.

12. The event surveillance method according to claim 8, further comprising:
transmitting incentive information to the smartphone that has transmitted the participation consent.

13. The event surveillance method according to claim 8, further comprising:

causing the at least one display device to display, on an image of the event venue based on the position information, positions of the smartphones and a heat map indicating distribution of degree of congestion; and acquiring the information of the surveillance-desired area by receiving an input of designation of the surveillance-desired area, the surveillance-desired area being designated based on the displayed positions and the displayed heat map.

14. A non-transitory computer-readable storage medium storing a program that causes a computer to perform an event surveillance method for surveillance of an event venue, the event surveillance method comprising:

acquiring information of a surveillance-desired area;

acquiring position information of smartphones owned by people who do not fall under the security guard, based on at least one of Global Positioning System (GPS) and an access point of Wireless Fidelity (Wi-Fi);

transmitting, to a smartphone, among the smartphones, participation request information that represents a request for participation of surveillance with use of a camera of the smartphone in a surveillance-desired area, based on the acquired position information;

receiving participation consent which represents an affirmative response to the participation request information, from the smartphone, the participation consent being sent when a user of the smartphone takes an action to participate in the surveillance in the surveillance-desired area;

performing a face comparison for people involved in the event;

causing an at least one display device to display at least one of:
- an image captured by a wearable camera worn by a security guard;
- an image captured by the smartphone; and
- a result of the face comparison;

causing the smartphone that has transmitted the participation consent to run a program that causes the smartphone to control an output device equipped in the smartphone such that, while the smartphone is used for capturing an image for the surveillance, the output device convey to surrounding people that image capturing by the smartphone is in progress based on consignment of surveillance work.

15. The storage medium according to claim 14, wherein the event surveillance method comprises transmitting the participation request information to a smartphone that is present in the surveillance-desired area.

16. The storage medium according to claim 14, wherein the event surveillance method further comprises:

receiving a moving image from the smartphone that has transmitted the participation consent;

causing the at least one display device to display the received moving image; and transmitting, to a person holding the smartphone, an instruction to the person from an operator who watches the displayed moving images.

17. The storage medium according to claim 14, wherein the event surveillance method further comprises:

causing the at least one display device to display, on an image of the event venue based on the position information, positions of the smartphones and a heat map indicating distribution of degree of congestion; and acquiring the information of the surveillance-desired area by receiving an input of designation of the surveillance-desired area, the surveillance-desired area being designated based on the displayed positions and the displayed heat map.

* * * * *